US008339669B2

(12) United States Patent
Tomita et al.

(10) Patent No.: US 8,339,669 B2
(45) Date of Patent: Dec. 25, 2012

(54) IMAGE FORMING APPARATUS AND IMAGE FORMING METHOD WITH SHEET SLIP COMPENSATION

(75) Inventors: Norio Tomita, Nara (JP); Yoshikazu Harada, Nara (JP); Tetsushi Ito, Nara (JP); Yoshiteru Kikuchi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 737 days.

(21) Appl. No.: 12/029,354

(22) Filed: Feb. 11, 2008

(65) Prior Publication Data

US 2008/0220347 A1 Sep. 11, 2008

(30) Foreign Application Priority Data

Mar. 6, 2007 (JP) .................................. 2007-56294

(51) Int. Cl.
*G06K 15/00* (2006.01)
*G06K 15/02* (2006.01)
*H04N 1/60* (2006.01)

(52) U.S. Cl. ............................ 358/2.1; 358/1.9; 358/1.2

(58) Field of Classification Search ........................ None
See application file for complete search history.

(56) References Cited

U.S. PATENT DOCUMENTS

| | | | | |
|---|---|---|---|---|
| 5,202,769 | A * | 4/1993 | Suzuki | 358/300 |
| 6,445,463 | B1 * | 9/2002 | Klassen | 358/1.9 |
| 2002/0176104 | A1 * | 11/2002 | Noguchi et al. | 358/1.9 |
| 2006/0140654 | A1 | 6/2006 | Takiguchi et al. | |
| 2006/0159498 | A1 * | 7/2006 | Takiguchi et al. | 399/388 |

FOREIGN PATENT DOCUMENTS

| | | | |
|---|---|---|---|
| JP | 7-193693 | A | 7/1995 |
| JP | 2001-13841 | A | 1/2001 |
| JP | 2001-109326 | A | 4/2001 |
| JP | 2006-189480 | A | 7/2006 |

* cited by examiner

*Primary Examiner* — Twyler Haskins
*Assistant Examiner* — Barbara Reinier
(74) *Attorney, Agent, or Firm* — Birch, Stewart, Kolasch & Birch, LLP

(57) ABSTRACT

An LD switch is turned ON to output image data outputted from an image processing section to a laser diode, and to irradiate a laser light to a photosensitive drum. The number of pixel dots included in the image data outputted from the image processing section is computed by line basis to detect an image density based on the total sum of the pixel dots of each color at a timing when the image data of Nth line is outputted from the image processing section. The detected image density is compared with a threshold value to turn OFF the LD switch at a timing when the image data of (N+α)th line is outputted when the image density is greater than the threshold value. This suppresses a variation in a rear-end-void length due to sheet slippage.

20 Claims, 12 Drawing Sheets

IMAGE FORMING APPARATUS AND IMAGE FORMING METHOD WITH SHEET SLIP COMPENSATION

CROSS-REFERENCE TO RELATED APPLICATIONS

This nonprovisional application claims priority under 35 U.S.C. §119(a) on Patent Application No. 2007-56294, filed in Japan on Mar. 6, 2007, the entire contents of which are hereby incorporated by reference.

BACKGROUND OF THE INVENTION

The present invention relates to an image forming apparatus and image forming method for suppressing deterioration of an image quality due to a variation in a rear-end-void length that is a margin area of a sheet.

A color image forming apparatus employing an electrophotographic system, such as a laser printer, a digital copy machine, a facsimile machine, or a multifunction printer, typically includes photosensitive drums for each color of cyan (C), magenta (M), yellow (Y), and black (K), an image writing section for forming an electrostatic latent image on the photosensitive drums, a development device for electrostatically adsorbing toner on the electrostatic latent image formed on the photosensitive drums through a development roller, a transfer belt for transferring the toner image developed on the photosensitive drums onto a sheet, a fusing device having a heater and a press roller for fusing the toner image transferred on the sheet, a toner box for storing the toner of each color, a conveying path for feeding or discharging the sheet, a sheet feeding cassette for storing the sheet.

For such a color image forming apparatus, measures to prevent toner from scattering are applied to improve a quality of the image formed on the sheet. For example, when the toner image is fused on the sheet, thermal expansion of the press roller caused by heating of the press roller may occur, which increases an outer diameter of the press roller to increase a sheet conveying speed by an amount of the expansion. As a result, there has arisen a problem that an image or printing matter is offset out of the sheet, and the toner scatters inside the apparatus upon the transferring on the photosensitive drums. To address this problem, an image forming apparatus having a variable image mask timing, in which a change in the sheet conveying speed due to the thermal expansion of the press roller is detected, and a rear-end mask is provided at an appropriate timing, has been proposed (refer to Japanese Patent Application Laid-Open No. H7-193693).

BRIEF SUMMARY OF THE INVENTION

Although the image forming apparatus disclosed in Japanese Patent Application Laid-Open No. H7-193693 can suppress the deterioration of the image quality due to the scattering of toner by preventing the forming of image offset out of the sheet, it cannot solve the problem that a length of the margin area of the rear end in a sheet conveying direction (referred to as "rear-end-void length") varies.

More specifically, here, it is assumed that when an image is formed in a single color (e.g., only black), a predetermined transferring electric field is set to suppress the toner scattering which occurs when a black toner image (e.g., layer thickness of 10-20 μm) is transferred. Typically, when image density becomes high in a case where the image is formed in one color, or when the image is formed using multiple colors (e.g., four colors of yellow, magenta, cyan, and black), the layer thickness of a toner image becomes thicker. For this reason, adsorptivity of the toner becomes insufficient, and the sheet slips upon transferring, thereby decreasing the sheet conveying speed. The sheet slip becomes especially remarkable, when image density is higher. Thus, the rear-end-void length of the sheet varies corresponding to the image density, which triggers the deterioration of the image quality.

Further, it is possible to shorten the rear-end-void length and reduce the variation thereof by expanding an image forming area to a proximity to the rear end of the sheet. However, when double-side printing is performed, the rear end of the sheet may become the leading end in the conveying direction. Thus, there occurs a problem in that, when a toner image is received in proximity to the sheet leading end, the sheet winds around the fusing roller during fusing.

The present invention addresses the problems, and provides an image forming apparatus and image forming method for detecting an image density, and adjusting a rear-end-void based on the detected image density. Thus, the apparatus and method may be able to suppress a variation in the rear-end-void to prevent deterioration of an image quality even when the image density is relatively high.

Further, the present invention provides an image forming apparatus and image forming method, in case an image is formed on a sheet based on image data in a plurality of colors, for detecting an image density by adding up the image data in each color. Thus, the apparatus and method may be able to accurately detect the image density even when the image is formed in the plurality of colors.

Further, the present invention provides an image forming apparatus and image forming method for controlling an irradiation start timing and/or an irradiation end timing of light to be irradiated from a light irradiating section based on the detection result of the image density, to adjust the size of an image forming area on a sheet. Thus, the apparatus and method may be able to suppress a variation in a rear-end-void.

Further, the present invention provides an image forming apparatus and image forming method for detecting an image density based on image data outputted by an image data outputting section up to a predetermined detection timing, and controlling the irradiation end timing of light to be irradiated from the light irradiating section based on the detected image density. Thus, the apparatus and method may be able to perform the image density detection, while irradiating the light from the light irradiating section at the same time and, thus, increasing the processing speed of an image forming.

Further, the present invention provides an image forming apparatus and image forming method, in a case that an image is formed based on image data of a plurality of colors, for detecting an image density by adding up the image data of each color outputted by an image data outputting section up to a predetermined detection timing. Thus, the apparatus and method may be able to perform a detection of the image density, while irradiating the light from the light irradiating section at the same time and, thus, increasing a processing speed of the image forming even when forming the image in the plurality of colors.

Further, the present invention provides an image forming apparatus and image forming method, in a case that an image is formed based on image data of a plurality of colors, for providing a delaying section for delaying output timings to be outputted by an image data outputting section to respective light irradiating sections. Thus, the apparatus and method may be able to prevent that the output of the image data to the light irradiating section is finished before the image density detection is finished.

Further, the present invention provides an image forming apparatus and image forming method in which a delay time of image data in each color to be delayed is greater than a time difference between a first detection timing at which the image density is detected based on the image data in each color, and a second detection timing at which the image density is detected based on the image data in a color of the last forming image on the sheet. Thus, the apparatus and method may be able to prevent that the output of the image data to the light irradiating section is finished before the image density detection is finished.

Further, the present invention provides an image forming apparatus and image forming method, in a case that an image is formed based on a single color, for inhibiting the delay of an output timing to the light irradiating section for the image data in the single color. Thus, the apparatus and method may be able to increase the processing speed of the image formation.

Further, the present invention provides an image forming apparatus and image forming method for storing information associated with the image density and the irradiation end timing of the light. Thus, the apparatus and method may be able to increase the processing speed of the image forming without calculating the irradiation end timing of the light based on the detected image density, while even when applying to a type of the apparatus having a different function, such as a printing speed, the apparatus and method may be able to easily adjust the rear-end-void only by storing a specific information relating to the function for the type.

Further, the present invention provides an image forming apparatus and image forming method for adjusting a size of the image forming area by magnifying the image based on the image density. Thus, the apparatus and method may be able to adjust the rear-end-void, while controlling a magnification difference of the formed images even when the sheet is slipped at the time fusing.

Further, the present invention provides an image forming apparatus and image forming method for magnifying the image in one side along the conveying direction of the sheet. Thus, the apparatus and method may be able to adjust the rear-end-void, while controlling the magnification difference of the formed images.

Further, the present invention provides an image forming apparatus and image forming method for detecting the image density based on the image data for one sheet page. Thus, the apparatus and method may be able to adjust the rear-end-void for each page of the sheet.

Further, the present invention provides an image forming apparatus and image forming method for adjusting the size of the image forming area, while providing a margin area on the rear-end side of the sheet. Thus, the apparatus and method may be able to prevent that the sheet winds around the fusing roller at the time of double-side printing, and does not brake away from the fusing roller.

According to one aspect of the invention, an image forming apparatus includes a light irradiating section that irradiates light to form an electrostatic latent image on a surface of a photosensitive drum, an image data outputting section that outputs image data to the light irradiating section, a developing section that develops the electrostatic latent image on the surface of the photosensitive drum, a transferring section that transfers the developed electrostatic latent image to form an image on a sheet, a density detecting section that detects an image density based on the image data outputted by the image data outputting section, and an adjusting section that adjusts a size of an image forming area on the sheet based on the detection result by the density detecting section.

The density detecting section detects an image density of an image to be formed on a sheet based on the image data outputted by the image data outputting section. The density detecting section may include an adder, a memory, for example, and adds up the number of dots (for example, when 256 color-tones per pixel, the number of dots contained in a pixel is 0-255) of the image data (for example, image data of each sheet page) outputted by the image data outputting section. The adjusting section adjusts a size of the image forming area of the sheet based on the detected image density. For example, when the image density is high, the adjusting section makes the image forming area larger (for example, longer in a sheet conveying direction) to suppress the situation in which a rear-end-void becomes larger (or longer) due to a sheet slip during fusing. Further, when the image density is not high (for example, medium or lower density), the adjusting section does not make the image forming area larger than a predetermined size (for example, it does not make the image forming area longer in the sheet conveying direction). Thus, the adjusting section adjusts the rear-end-void based on the detected image density. Therefore, even when the image density is high, variation in the rear-end-void can be suppressed, and deterioration of image quality can be prevented.

According to another aspect of the invention, the image data outputting section outputs the image data in a plurality of colors. The density detecting section detects the image density based on the image data in the plurality of colors, when forming the image on the sheet based on the image data in the plurality of colors. When the image is formed on the sheet based on the image data in the plurality of colors, the image density is detected by adding up the image data for each color. For example, the image formation is performed in four colors of yellow, magenta, cyan, and black, the density detecting section adds up the number of dots of the image data for each color outputted by the image data outputting section to detect the image density by taking the total number of dots for each color. Therefore, even when the image is formed in a plurality of colors, the image density can be accurately detected.

According to another aspect of the invention, the image forming apparatus further includes a control section that controls an irradiation start timing and/or an irradiation end timing of the light being irradiated by the light irradiating section based on the detection result by the density detecting section. The adjusting section adjusts the size of the image forming area on the sheet based on the control result by the control section. The control section controls an irradiation start timing and/or an irradiation end timing of the light being irradiated by the light irradiating section based on the detected image density. For example, when the image density is high, by delaying the irradiation end timing of the light, the image forming area is made larger, and the rear-end-void does not vary even when the sheet slips. Further, when the image density is not high, the irradiation start timing is set to a predetermined timing without being delayed so that the rear-end-void becomes a predetermined size. Further, when the image density is high, by making the irradiation start timing earlier, the image forming area becomes larger not to vary the rear-end-void even when the sheet slips. That is, based on the detection result of the image density, the irradiation start timing and/or the irradiation end timing of the light to be irradiated is controlled to adjust the size of the image forming area of the sheet. Therefore, the variation in the rear-end-void can be suppressed.

According to another aspect of the invention, the density detecting section detects the image density based on the image data outputted up to a predetermined detection timing by the image data outputting section, and the control section controls the irradiation end timing of the light being irradiated by the light irradiating section according to the detected image density. The density detecting section detects the image density based on the image data outputted up to the predetermined detection timing. For example, the predetermined detection timing may be based on when a rear-end-void length becomes a predetermined length (for example, 4 mm) from the rear end of the sheet (for example, a position corresponding to Nth line of the image data). That is, the density detecting section detects the image density by adding up the number of dots of the image data outputted by the image data outputting section up to a timing when the rear-end-void length becomes the predetermined length. Further, the control section controls the irradiation end timing of the light being irradiated by the light irradiating section based on the detected image density. For example, when the image density is detected, if the image density is lower than a predetermined threshold value, the irradiation of the light is terminated. That is, the irradiation of the light is terminated at Nth line of the image data. Thus, the rear-end-void length becomes the predetermined length. Further, the detected image density is larger than the predetermined threshold value; the irradiation end timing of the light is delayed according to high/low of the detected image density. That is, the irradiation of the light is terminated at $(N+\alpha)$th line of the image data. Here, $\alpha$ may be varied according to the image density. Therefore, by making the image forming area larger (or longer) for higher image density, the variation in the rear-end-void length can be suppressed even when the sheet slips. Further, the detection of the image density can be performed, while irradiating the light by the light irradiating section at the same time, and the processing speed of the image formation can be increased.

According to another aspect of the invention, the density detecting section detects the image density based on the image data in the plurality of colors outputted by the image data outputting section up to the predetermined detection timing when forming the image on the sheet based on the image data in the plurality of colors. For example, when the image is formed in four colors of yellow, magenta, cyan, and black, the density detecting section adds up the number of dots of the image data for each color outputted by the image outputting section up to a timing when the rear-end-void length becomes a predetermined length (for example, a timing corresponding to Nth line of the image data), and detects the image density by taking the sum total of dots for each color. Therefore, even when the image is formed in a plurality of colors, the image density can be accurately detected. Further, the image density detection can be performed, while irradiating the light by the light irradiating section at the same time. Thus, the processing speed of the image formation can be increased.

According to another aspect of the invention, the image forming apparatus further includes a delaying section that delays an output timing to the light irradiating section for each of the image data in the plurality of colors outputted by the image data outputting section when forming the image on the sheet based on the image data in the plurality of colors. For example, the delaying section may be constituted with line memories. When the image is formed on the sheet based on the image data in a plurality of colors, the output timing to the light irradiating section is delayed for the image data of the plurality of colors outputted by the image data outputting section. For example, photosensitive drums for four colors of yellow, magenta, cyan, and black are arranged so as to be spaced apart from each other. In a case that toner images developed on the photosensitive drums are transferred to the sheet through an intermediate transfer belt, when the image is formed using toners for four colors, formation of electrostatic latent images is delayed until the completion of the detection of image density for all of the four colors. Thus, it is possible to prevent an occurrence of the case in which the output of the image data to the light irradiating section is finished before the detection of the image density is finished.

According to another aspect of the invention, a delay time of the image data in each color delayed by the delaying section is more than a time difference between a first detection timing at which the image density is detected based on the image data in each color and a second detection timing at which the image density is detected based on the image data in the color of the image to be formed finally on the sheet. For example, in the case where the photosensitive drums for respective colors are arranged in an order of yellow, magenta, cyan, and black from upstream side to downstream side of the intermediate transfer belt, the image density for all the four colors is detected at the timing (second detection timing) when the image data for black on the most downstream side is detected. At this timing, the completion of the electrostatic latent image formation of the yellow image data on the most upstream side onto the photosensitive drum is prevented. That is, the delay time of the output timing of the yellow image data to the light irradiating section is set to greater than a time difference between a timing when the image density can be detected based on the yellow image data (first detection timing), and a timing when the image density for all the four colors can be detected (second detection timing). Therefore, when the image is formed based on the yellow image data, it is possible to prevent an occurrence of the case in which the output of the image data to the light irradiating section (e.g., electrostatic latent image formation onto the yellow photosensitive drum) is finished before the detection of the image density of all the four colors is finished.

According to another aspect of the invention, the image forming apparatus further includes an inhibiting section that inhibits the delay of the output timing to the light irradiating section for the image data in a single color when forming the image on the sheet based on the image data in the single color. When the image is formed on the sheet based on the image data of a single color, the delay of the output timing of the image data for the single color to the light irradiating section is inhibited. For example, when the image is formed only in black, the image density can be detected at a predetermined detection timing before the output of the image data from the image data outputting section to the light irradiating section. Thus, the output timing of the image data to the light irradiating section does not need to be delayed by the line memory, etc. Therefore, the processing speed of the image formation can be increased.

According to another aspect of the invention, the image forming apparatus further includes a storage section that stores information associated with the image density and the irradiation end timing of the light. The storage section stores information associated with the image density and the irradiation end timing of the light. For example, information associated with the image density and the irradiation end timing of the light when the image density becomes higher than a predetermined threshold value (i.e., reference density) may be used (for example, information indicating the delay amount according to the image density where the delay amount at the irradiation end timing at the time of the reference density is set to "0"). Therefore, the processing speed of the image formation can be increased without calculating the irradiation end timing based on the detected density. Further, even if the schemes of the present invention is applied to different models of different functions (e.g., printing speed), the rear-end-void may be readily adjusted only by storing the information specific to those models.

According to another aspect of the invention, the image forming apparatus further includes a magnifying section that varies a magnifying ratio of the image based on the detection result by the density detecting section. The adjusting section adjusts the size of the image forming area on the sheet according to the magnifying ratio varied by the magnifying section. The image is magnified based on the image density to adjust the size of the image forming area. For example, an image is formed in four colors of yellow, magenta, cyan, and black, the image density is detected based on the image data for each color of one sheet page. In this case, the image data for each color (for example, image data of N lines) may be once stored in the image memories (e.g., line memories). The relationship between the image density and the magnifying ratio may be set in advance. The magnifying section may magnify the image of each color. For example, when the image density is higher than a predetermined threshold value (i.e., reference density), upon outputting each line of the image data to the light irradiating section, every time the image data of adjacent plural lines are outputted, the same line is outputted twice in succession based on the magnifying ratio set according to the image density, to increase the lines to be outputted to the light irradiating section. Further, when the detected image density is equal to or lower than a predetermined threshold value, the magnifying section outputs the image data stored in the line memories without performing the magnifying process. Therefore, because the image is magnified substantially uniformly, the rear-end-void may be adjusted, while controlling an abnormal magnification of the formed image without deteriorating the image quality, even when the sheet slips during transferring.

According to another aspect of the invention, the magnifying section performs a one-sided magnification of the image along a conveying direction of the sheet. Because the image is magnified by one side along the sheet conveying direction, the rear-end-void length can be adjusted, while suppressing the abnormal magnification of the formed image.

According to another aspect of the invention, the density detecting section detects the image density based on the image data for each sheet page. Because the image density is detected based on the image data for each sheet page, the rear-end-void length can be adjusted for each sheet page.

According to another aspect of the invention, the adjusting section adjusts the size of the image forming area by providing a margin area on a rear-end side of the sheet in a conveying direction thereof. Because the size of the image forming area is adjusted by providing the margin area on the rear-end side of the sheet, it is possible to prevent the sheet from being winded around the fusing roller without breaking off from the fusing roller by providing the margin area in proximity to the leading end of the sheet, when the rear end of the sheet becomes a leading end in the conveying direction at the time of performing double-side printing.

The above and further objects and features of the invention will more fully be apparent from the following detailed description with accompanying drawings.

DETAILED DESCRIPTION OF THE INVENTION

The present invention will be described in more detail below with reference to the drawings which illustrate embodiments of the present invention.

(Embodiment 1)

Figure 1:
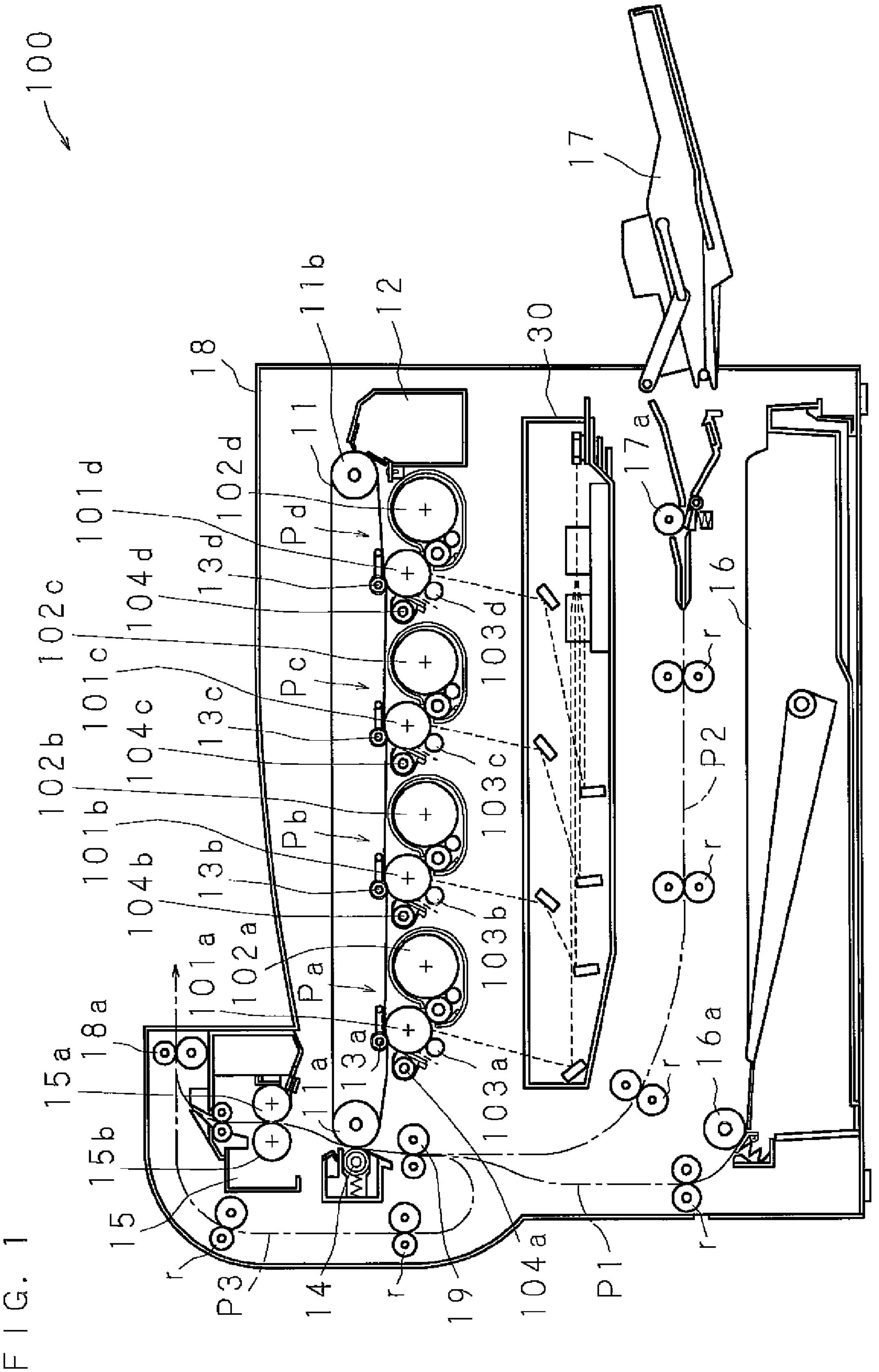
FIG. 1 is a frontal cross-sectional view schematically showing an image forming apparatus.

FIG. 1 is a frontal cross-sectional view schematically showing an image forming apparatus 100 according to the present invention. The image forming apparatus 100 forms an image in multiple colors (referred to as "multiple color mode") or in a single color (referred to as "single color mode") according to image data inputted from the outside. The image forming apparatus 100 includes an image writing section (e.g., an exposing unit) 30, photosensitive drums 101*a*-101*d*, developing units 102*a*-102*d*, charging rollers 103*a*-103*d*, cleaning units 104*a*-104*d*, an intermediate transfer belt 11, intermediate transfer rollers 13*a*-13*d*, a secondary transfer roller 14, a fusing device 15, sheet conveying paths P1, P2, and P3, a sheet feeding cassette 16, a manual sheet feeding tray 17, a sheet discharging tray 18.

The image forming apparatus 100 performs the image formation using image data for hues of yellow (Y), magenta (M), and cyan (C), which are three subtractive primary colors obtainable by color separation of a color image, in addition to black (K). Four photosensitive drums 101*a*-101*d*, four developing units 102*a*-102*d*, four charging rollers 103*a*-103*d*, four intermediate transfer rollers 13*a*-13*d*, and four cleaning units 104*a*-104*d* are provided corresponding to each hue to constitute four image forming units Pa-Pd. The image forming units Pa-Pd are arranged along a moving direction of the intermediate transfer belt 11 (typically, in the sub scanning direction) so as to spaced apart for each other by a predetermined distance.

The charging rollers 103*a*-103*d* are contact-type charging devices that uniformly charge surfaces of the photosensitive drums 101*a*-101*d* with a predetermined electric potential. Instead of the charging rollers 103*a*-103*d*, contact-type charging devices using charging brushes, or non-contact-type charging devices such as using chargers may be employed. The image writing section 30 includes semiconductor lasers, polygon mirrors, and reflective mirrors. The image writing section 30 irradiates laser beams, each of which is modulated according to the image data for each hue of yellow, magenta, cyan, and black, onto the photosensitive drums 101*a*-101*d* so that latent images corresponding to the respective image data are formed on the surface of the photosensitive drums 10l*a*-101*d*, respectively. That is, the latent images according to image data for each of the hues of black, cyan, magenta, and yellow are formed on the respective photosensitive drums 101*a*-101*d*.

Thus, for example, when a monochrome image is formed in the single color mode, a black toner image is formed on the photosensitive drum 101*a*. Alternatively, when an image only using cyan is formed, a cyan toner image is formed on the photosensitive drum 101*b*. Alternatively, when a full color image is formed in the multiple color mode, toner images of respective colors are formed on the photosensitive drums 101*a*-101*d*.

The developing units 102*a*-102*d* supply developer (e.g., toner) onto the surfaces of the photosensitive drums 101*a*-101*d* on which the corresponding latent images are formed, and develop the latent images into toner images. Each of the developing units 102*a*-102*d* contains the developer corresponding to each hue of black, cyan, magenta, and yellow, respectively. The latent images of each hue formed on the photosensitive drums 101*a*-101*d* are developed to the toner images of each hue of black, cyan, magenta, and yellow. The cleaning units 104*a*-104*d* remove and recover the toner left on the surfaces of the photosensitive drums 101*a*-101*d* after the toner images are transferred.

The intermediate transfer belt 11 arranged above the photosensitive drums 101*a*-101*d* is tensioned between a driving roller 11*a* and a driven roller 11*b*. The photosensitive drum 101*d*, photosensitive drum 101*c*, photosensitive drum 101*b*, and photosensitive drum 101*a* are arranged in this order from upstream to downstream along the moving direction of the intermediate transfer belt 11 so as to oppose to a surface of the intermediate transfer belt 11. The intermediate transfer rollers 13*a*-13*d* are arranged at positions opposing to the respective photosensitive drums 101*a*-101*d* so as to intervene the intermediate transfer belt 11 therebetween. A transfer bias having an opposite polarity to the toner charge polarity is applied to the intermediate transfer rollers 13*a*-13*d* so as to transfer the toner images carried on the surfaces of the photosensitive drums 101*a*-101*d* onto the intermediate transfer belt 11. Accordingly, the toner images of each hue formed on the photosensitive drums 101*a*-101*d* are sequentially and superimposedly transferred onto the outer circumferential surface of the intermediate transfer belt 11, resulting in the formation of a full color toner image on the outer circumferential surface of the intermediate transfer belt 11.

If image data only for one or some of, but not all of the hues of black, cyan, magenta, and yellow, is inputted, latent images and toner images are formed on the same number of the photosensitive drums 101*a*-101*d* corresponding to the hues of the inputted image data. For example, when forming a monochrome image, a latent image and toner image are formed on the photosensitive drum 101*a* corresponding only to black hue, and only the black toner image is transferred onto the outer circumferential surface of the intermediate transfer belt 11.

The intermediate transfer rollers 13*a*-13*d* are constituted with a metal shaft (e.g., stainless steel) having a diameter of approximately 8-10 mm covered with a conductive elastic material (e.g., ethylene-propylene-diene rubber (EPDM), urethane foam, etc.) to apply high voltage uniformly onto the intermediate transfer belt 11 through this conductive elastic material. A brush-shaped intermediate transfer member may be used instead of the intermediate transfer rollers 13*a*-13*d*. The toner image formed on the outer circumferential surface of the intermediate transfer belt 11 is conveyed to an opposing position to the secondary transfer roller 14 by the rotation of the intermediate transfer belt 11. The secondary transfer roller 14 press-contacts the outer circumferential surface of the intermediate transfer belt 11 at a predetermined nip pressure during the image formation. When a sheet (e.g., a paper) fed from the sheet feeding cassette 16 or the manual sheet feeding tray 17 passes through between the secondary transfer roller 14 and the intermediate transfer belt 11, the secondary transfer roller 14 is applied with a high voltage having an opposite polarity to the toner charge polarity. Thus, the toner image is transferred onto the sheet surface from the outer circumferential surface of the intermediate transfer belt 11.

In this embodiment, in order to maintain the nip pressure of the predetermined pressure between the secondary transfer roller 14 and the intermediate transfer belt 11, one of the secondary transfer roller 14 or the driving roller 11*a* may be constituted with rigid material (e.g., metal), and the other elastic roller 11*b* may be constituted with non-rigid material (e.g., elastic rubber, foamable resin, etc.). The cleaning unit 12 recovers the toner resided on the intermediate transfer belt 11 without being transferred on the sheet, among the toner adhered to the intermediate transfer belt 11 from the photosensitive drums 10l*a*-101*d*, so as to prevent mixing of the colors during the following process. The sheet onto which the toner image is transferred is guided to the fusing device 15, and then passes through between a heat roller 15*a* and a press roller 15*b* so as to be applied with heat and pressure. Accordingly the toner image transferred onto the sheet is fused on the surface of the sheet. The sheet fused with the toner image is discharged onto the sheet discharging tray 18 by the discharge roller 18*a*.

In this embodiment, a conveying path P1 is arranged in a substantially vertical direction so as to feed a sheet stored in the sheet cassette 16 to the sheet discharging tray 18 through between the secondary transfer roller 14 and the intermediate transfer belt 11 and through the fusing device 15. On the conveying path P1, there are arranged a pickup roller 16*a* for picking up a sheet in the sheet cassette 16 one by one and feeding into the conveying path P1, a conveying roller r for conveying the picked-up sheet upwardly, a resist roller 19 for guiding the conveyed sheet into between the secondary transfer roller 14 and the intermediate transfer belt 11 at a predetermined timing, a sheet discharge roller 18*a* for discharging the sheet to the sheet discharging tray 18. On the conveying path P2, there are arranged a pickup roller 17*a* and conveying rollers r between the manual sheet feeding tray 17 and the resist roller 19. The conveying path P3 is arranged between the sheet discharge roller 18*a* and an upstream side of the resist roller 19 on the conveying path P1.

The sheet discharge roller 18*a* is configured so as to be rotatable in both forward and reverse directions. When one-side printing is performed in which an image is formed only on one surface of a sheet, and when front surface printing of double-side printing in which images are formed on both sides of the sheet is performed, the sheet discharge roller 18*a* is driven to the forward direction to discharge the sheet to the sheet discharging tray 18. On the contrary, when back-side printing of the double-side printing is performed, the sheet discharge roller 18*a* is first driven to the forward direction until the rear end of the sheet passes through the fusing device 15, and then is driven to the reverse direction, while nipping a rear end portion of the sheet to guide the sheet into the conveying path P3. Accordingly, the sheet formed with an image only on one surface thereof during the double-side printing is guided into the conveying paths P3 and P1 in a state in which the front and back surfaces are reversed, as well as the leading and rear ends are reversed.

The resist roller 19 guides the sheet fed from the sheet cassette 16 or the manual sheet feeding tray 17, or the sheet conveyed through the conveying path P3, to between the secondary transfer roller 14 and the intermediate transfer belt 11 at a timing synchronized with the rotation of the intermediate transfer belt 11. Thus, the resist roller 19 stops its rotation when the photosensitive drums 101*a*-101*d* and the intermediate transfer belt 11 start their operations, and the sheet fed or conveyed prior to the rotation of the intermediate transfer belt 11 stops within the conveying path P1 with its leading end abutting against the resist roller 19. Then, the resist roller 19 starts rotating at a timing when the leading end portion of the sheet and the leading end portion of the toner image formed on the intermediate transfer belt 11 opposing to each other at a pressure-contact position of the secondary transfer roller 14 and the intermediate transfer belt 11.

Figure 2:
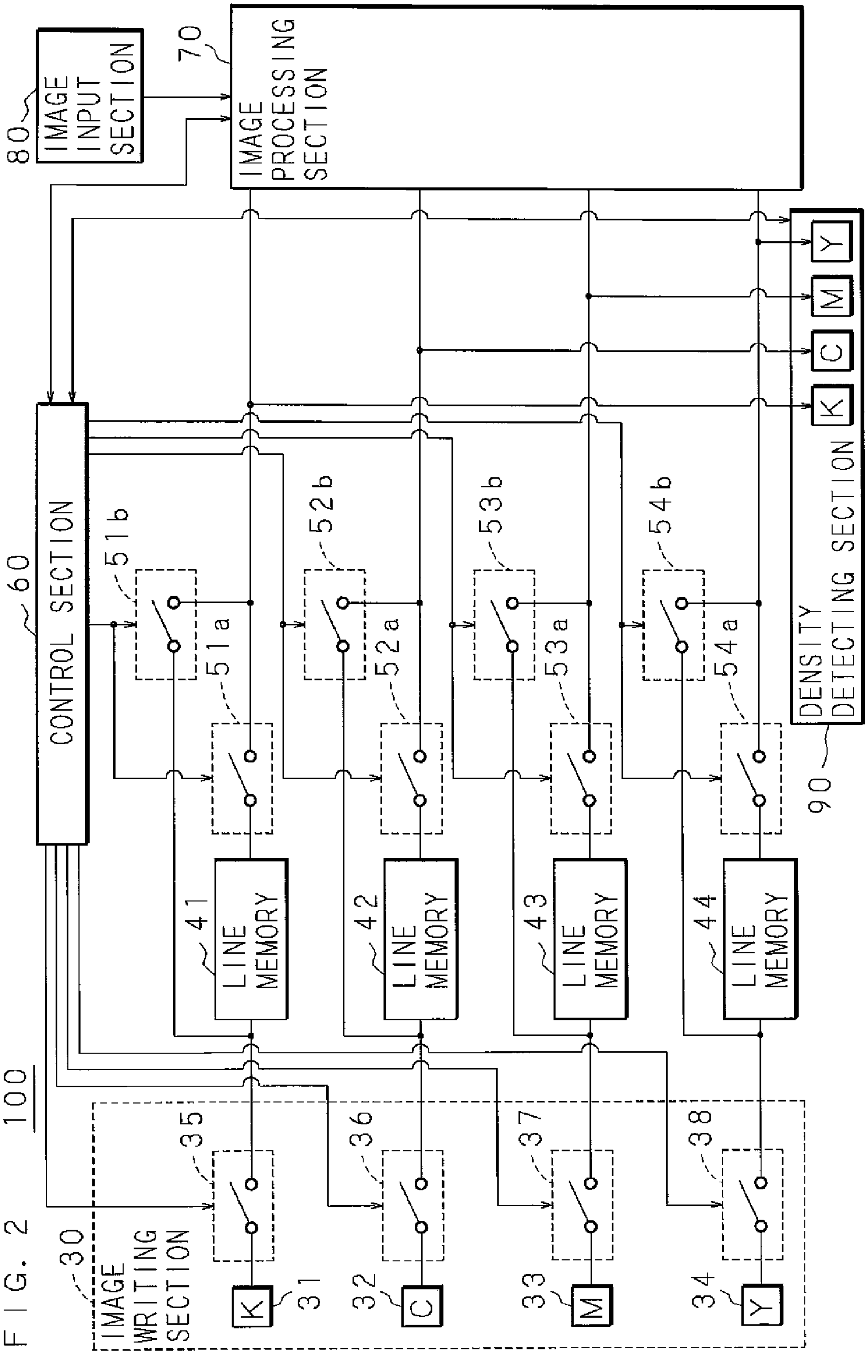
FIG. 2 is a block diagram showing a configuration of the image forming apparatus of Embodiment 1.

FIG. 2 is a block diagram showing a configuration of the image forming apparatus 100 according to the present invention. As shown in FIG. 2, the image forming apparatus 100 includes an image input section 80, an image processing section 70, a control section 60, a density detecting section 90, an image writing section 30, line memories (LM) 41-44, LM switches 51*a*-54*a* and 51*b*-54*b* for selectively switching to one or more of the line memories 41-44 to be used.

The image input section 80 is an interface mechanism for communication with a manuscript scanning device or a device outside the apparatus, and outputs image data scanned from a manuscript or image data acquired from a personal computer or "PC" (typically, RGB signals) to the image processing section 70. The image processing section 70 performs a predetermined conversion process on the image data inputted from the image input section 80, and outputs the converted image data to the image writing section 30. The conversion process may be, for example, raster conversion, UCR conversion, or YMCK conversion when RGB signal is inputted from the PC. Alternatively, the conversion process may be, for example, γ conversion, UCR conversion, or YMCK conversion when RGB signal is inputted from the manuscript scanning device.

The density detecting section 90 includes adders and memories for each color of black (K), cyan (C), magenta (M), and yellow (Y), and may be constituted with pixel counters. The density detecting section 90 adds up the number of dots in each pixel contained in image data for each color per one sheet page outputted from the image processing section 70 to detect the image density per one sheet page, and outputs the detection result to the control section 60. The image density detection may be, but not limited to, adding up the number of dots in each pixel contained in the entire image data or a portion of the image data contained in one sheet page. In this case, if there are 256 color-tones per pixel, the number of dots contained in a pixel is at most 256.

Under the control of the control section 60, in a case where an image is formed in the single color mode (e.g., only black), the density detecting section 90 adds up the number of dots contained in the black image data outputted from the image processing section 70 to detect the image density. Alternatively, in a case where an image is formed ill the multiple color mode (e.g., black, cyan, magenta, and yellow), the density detecting section 90 adds up the number of dots contained in the image data for each color outputted from the image processing section 70, and sums all the number of dots for each color to detect the image density.

The image writing section 30 includes laser diodes (LD) 31, 32, 33, and 34 for black, cyan, magenta, and yellow that irradiate laser beams onto the respective surfaces of the photosensitive drums 101*a*-101*d*, respectively, and LD switches 35, 36, 37, and 38 for turning ON/OFF the output of image data to the laser diodes 31-34, respectively.

The line memories 41-44 are disposed between the image processing section 70 and the image writing section 30, and holds the image data for black, cyan, magenta, and black outputted from the image processing section 70 for a predetermined period of time to delay an output timing of the image data to the image writing section 30. For example, in a case where the image is formed with four colors of black, cyan, magenta, and yellow, the output timing is delayed so that the laser-beam irradiation to the photosensitive drums 101*a*-101*d* is not completed before the detection of the image density for all the four colors is completed. The delay time of the image data for each color is determined by the control section 60. The capacity of the line memories 41-44 may be adequately selected according to the data size of the image data outputted from the image processing section 70 during the maximum delay time.

The LD switches 35-38 are subjected to ON/OFF control based on the LD control signals outputted from the control section 60. By turning ON the LD switches 35-38, the image data is outputted to the laser diodes 31-34, and at the same time, the laser beams are irradiated to the surfaces of the photosensitive drums 101*a*-101*d*, respectively, whereby the leading end position in the image forming area formed on a sheet (i.e., leading end void length of the sheet) can be adjusted. Further, by turning OFF the LD switches 35-38, the image data outputted to the laser diodes 31-34 is cut off, and at the same time, the irradiation of laser beams to the surfaces of the photosensitive drums 101*a*-101*d* is stopped, whereby the rear end position in the image forming area formed on the sheet (i.e., rear-end-void length of the sheet) can be adjusted. The LD switches 35-38 may be of contact-type such as relay, or non-contact-type such as a semiconductor switch (e.g., FET switch).

The LM switches 51*a*-54*a* and 51*b*-54*b* for switching the delay processes by the line memories 41-44 are subjected to ON/OFF control by the control section 60. When the image formation is performed in the single color mode, the delay processes by the line memories 41-44 do not need to be performed and, thus, the LM switches 51*a*-54*a* are turned OFF, while the LM switches 51*b*-54*b* are turned ON. Alternatively, when the image formation is performed in the multiple color mode, the delay processes by the line memories 41-44 need to be performed and, thus, the LM switches 51*a*-54*a* are turned ON, while the LM switches 51*b*-54*b* are turned OFF.

The control section 60 may be configured with a microprocessor or a dedicated hardware circuit, and controls the operation of the image forming apparatus 100. For example, the control section 60 performs ON/OFF control depending on whether the printing is in the single color mode or the multiple color mode. Further, upon image formation, the control section 60 performs ON/OFF control of the LD switches 35-38 depending on whether the image density per one sheet page is high or low to adjust the timing of laser-beam irradiation by the laser diodes 31-34 onto the surfaces of the photosensitive drums 101*a*-101*d*. As a result, the control section 60 adjusts a size of the image forming area of the sheet, that is, a rear-end-void length of the sheet to suppress the variation in the rear-end-void length due to slip of the sheet, which becomes remarkable at a high image density and, thereby preventing the deterioration of the image quality.

Figure 3:
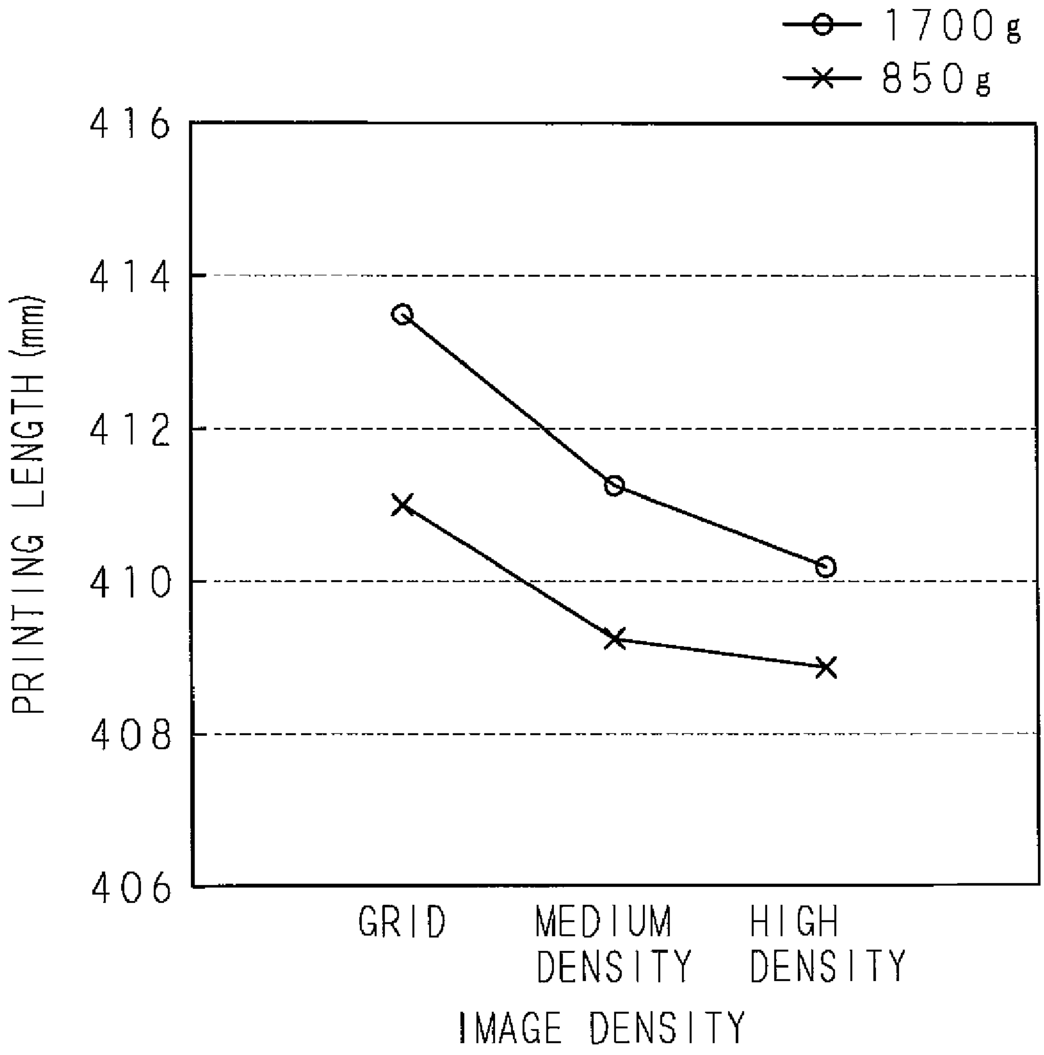
FIG. 3 is a graph showing an example of a relationship between an image density and a printing length.

FIG. 3 is a graph showing an example of a relationship between the image density and a printing length. In FIG. 3, the horizontal axis indicates the image density formed on a sheet, and the vertical axis indicates the printing length (that is, a length of the image forming area in the sheet conveying direction upon the formation of an image on the sheet). The sheets used herein are A3 size, and a weight of each sheet per square meter is 1700 g (indicated by circle symbols in the figure), and 850 g (indicated by cross symbols in the figure). As shown in FIG. 3, it is understood that the thicker the image density becomes, the shorter the printing length. Comparing with a grid image (which typically is a normal level of the image density), the printing length becomes shorter by 2-3 mm with the image density becoming higher. In other words, the rear-end-void length becomes longer by 2-3 mm. Therefore, when a number of images with different image densities are printed, the difference of the rear end voids becomes remarkable when comparing from one printed sheet to another, which results in ungainliness and deterioration of the image quality. Especially, the deterioration of the image quality and the variation in the rear-end-void length become remarkable when the image formation is performed in the multiple color mode.

Figure 4A:
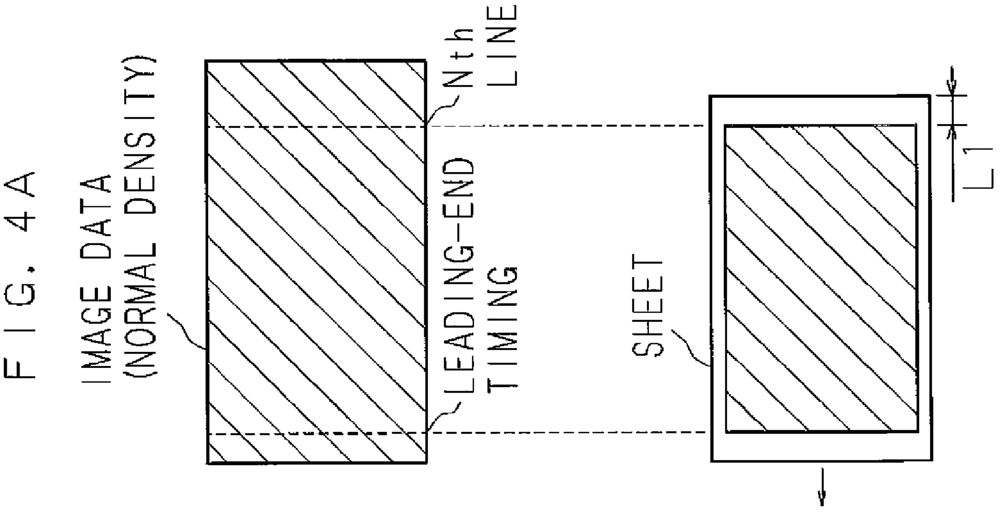
FIGS. 4A-4C are explanatory diagrams showing examples of suppressing a variation in a rear-end-void length.
Figure 4B:
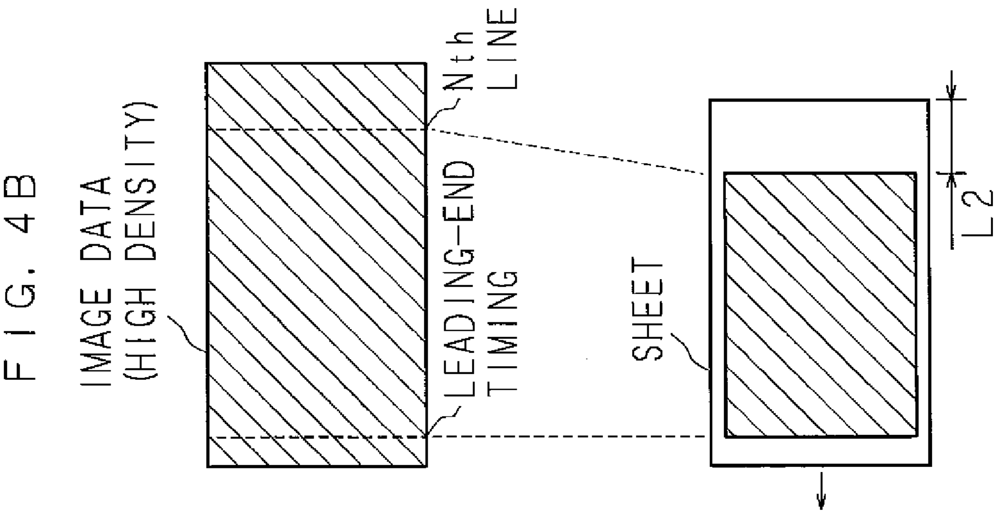
Figure 4C:
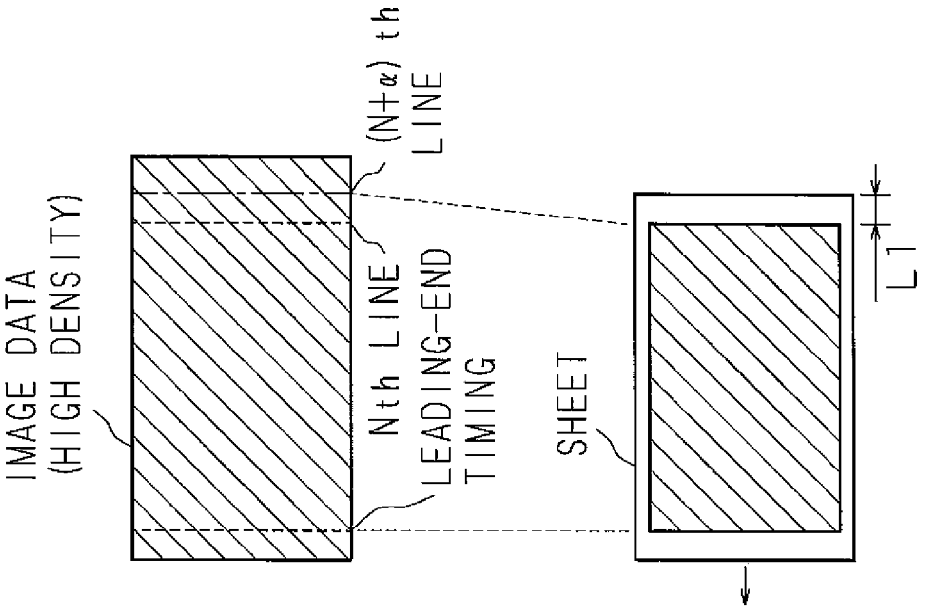

Next, operation of the image forming apparatus according to the present invention will be explained. FIGS. 4A-4C are explanatory diagrams showing examples of suppressing the variation in the rear-end-void length. In FIGS. 4A-4C, the upper drawings each shows image data for one sheet page, and the lower drawings each shows a sheet formed with the image. The arrows indicate the sheet conveying direction. The image formation may be performed either by the single color mode or the multiple color mode. FIG. 4A shows a case where the image density is lower than a predetermined threshold value (referred to as "normal image density"), and the rear-end-void length of the sheet is L1. In this case, the image formation starts at the leading end timing of the image data. The rear-end cut timing of the image data is at Nth line, and the image is formed based on the image data up to Nth line. In other words, the image at the rear end of the image forming area is formed based on the image data at Nth line.

FIG. 4B shows a case where the image density is higher than the predetermined threshold value (referred to as "high density"). When the image density becomes higher, the printing length becomes shorter due to the sheet slip during fusing, and consequently, the rear-end-void length L2 becomes longer (that is, L2>L1). The variation in the rear-end-void length ΔL(=L2−L1) reaches 2-3 mm according to the image density, as an example. Further, in this case, the image at the rear end of the image forming area is formed based on the image data at Nth line, as described above.

FIG. 4C shows a case where the rear-end-void length is adjusted. As shown in FIG. 4C, the rear-end cut timing of the image data is delayed from Nth line to (N+α)th line. In other words, irradiation end timings of the laser diodes 31-34 are delayed for a time period according to the image density (referred to as "delay amount"). Accordingly, because the image data for a lines is added to the rear-end side of the image forming area, the length of the image forming area formed on the sheet (i.e., printing length) becomes longer, and consequently, the rear-end-void length becomes L1. In this embodiment, the relationship between the image density and the delay amount (i.e., delay time) may be stored in the control section 60 as a rear-end cut timing table.

In FIGS. 4A-4C, the irradiation end timings of the laser diodes 31-34 are delayed for the delay amount (i.e., delay time) corresponding to the detected image density. However, without limiting to the configuration, the irradiation start timings of the laser diodes 31-34 may be made earlier according to the image density. In this case, the leading end timing of the image data is made earlier, while the image formation is started at a predetermined position of the sheet at the leading end timing. This operation may increase the number of image lines formed on the sheet. Further, it may be possible to use a combination of both the irradiation start timings and irradiation end timings of the laser diodes 31-34.

Figure 5:
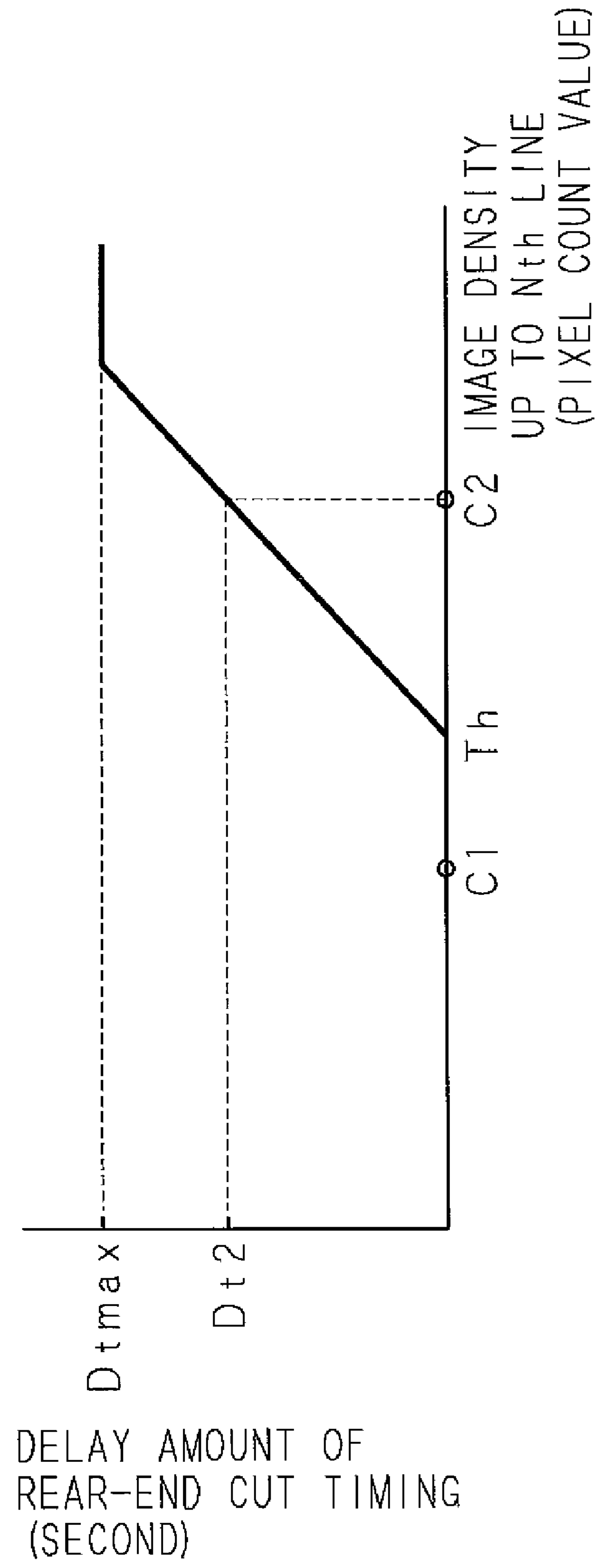
FIG. 5 is a graph showing an example of a rear-end cut timing table.

FIG. 5 is a graph showing an example of the rear-end cut timing table. In this Figure, the horizontal axis indicates the image density, and the vertical axis indicates the delay amount (i.e., delay time) of the rear-end cut timing. As shown in FIG. 5, when the image density (that is, "pixel count value" in this embodiment) computed to Nth line of the image data is higher than the threshold value Th, the delay amount is made larger depending on how much the image density is higher than the threshold value Th. For example, when the image density detected by adding up to Nth line is C2(>Th), the rear-end cut timing is delayed for Dt2. The rear-end-void length may be shortened by the number of image data lines written during the time period Dt2.

In contrast, when the image density detected by adding up to Nth line is C1(<Th), the rear-end cut timing is not delayed, and the output of the image data is cut at Nth line of the image data. Accordingly when the image density is the normal image density equal to or smaller than the threshold value Th, the adjustment of the rear-end-void length is not carried out.

Further, as shown in FIG. 5, a maximum value Dtmax of the delay amount of the rear-end cut timing is provided. This can make it possible to secure a minimum length of the rear-end-void length even when the image density becomes higher. Accordingly, in a case where the double-side printing is performed, when the rear end of the sheet reaches the leading end in the conveying direction, a margin area can be provided in proximity to the leading end of the sheet to prevent the sheet from adhering to the fusing roller with being winded up around the fusing roller.

In this embodiment, the rear-end cut timing table may be set in advance according to the single color mode or the multiple color mode. Alternatively, the rear-end cut timing table may also be set to meet functions and models of the image forming apparatus (for example, low-speed model, medium-speed model, or high-speed model). Thus, the rear-end-void adjustment may be facilitated only by storing the rear-end cut timing table specific to each model. Therefore, the processing speed of the image formation can be improved without calculating the delay amount based on detected image density. The rear-end cut timing table shown in FIG. 5 is only an example, and the present invention is not limited thereto. For example, the table may have characteristics of showing the delay amount with a quadric curve corresponding to the increase of the image density. In this embodiment, the threshold value Th may be arbitrarily set for the single color mode and the multiple color mode.

Figure 6:
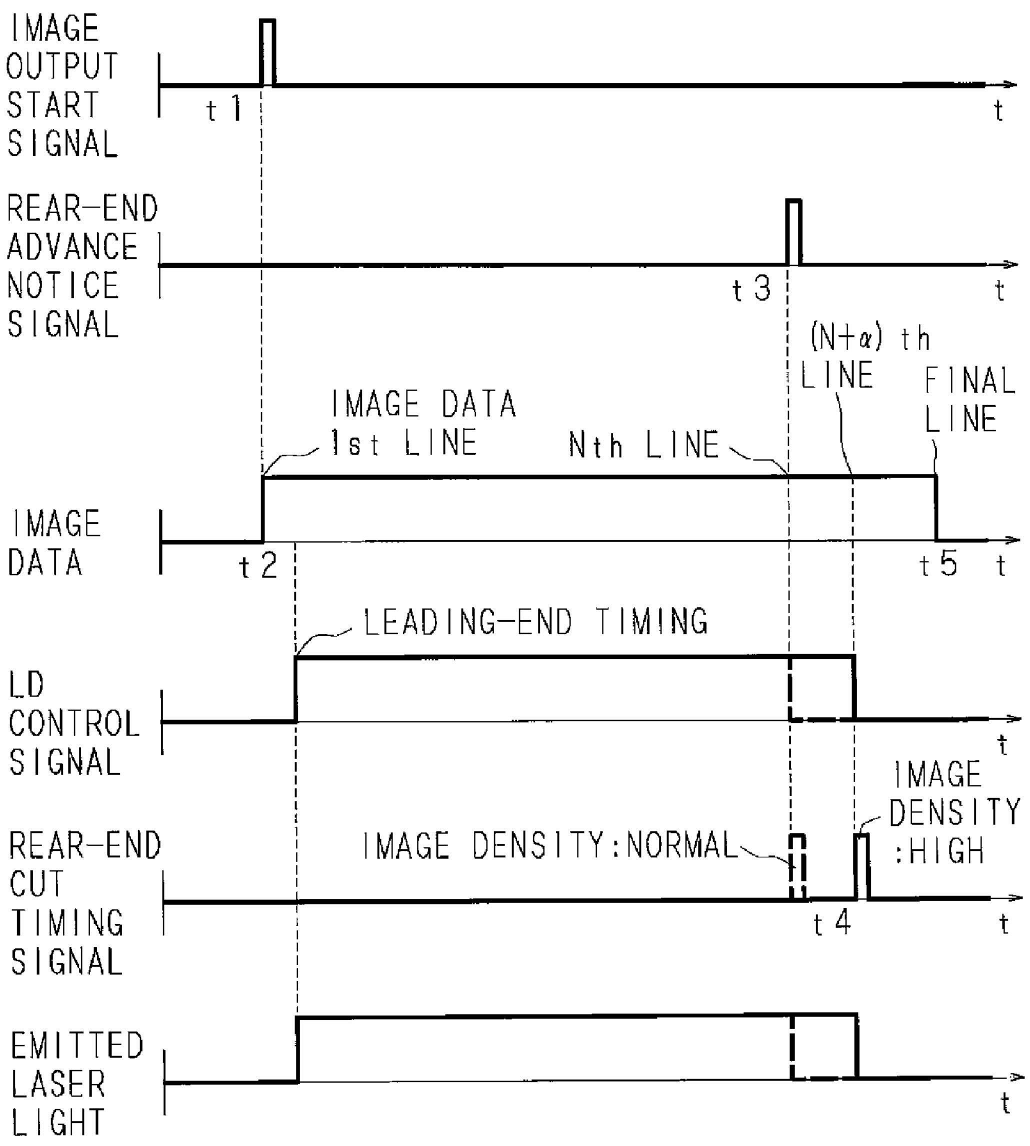
FIG. 6 is a timing chart during image formation in a single color mode of the image forming apparatus.

FIG. 6 is a timing chart illustrating a case where the image forming apparatus 100 according to the present invention forms an image in the single color mode. Further, FIG. 6 shows a case where an image for one sheet page is formed. In order to form images on a plurality of sheets, the process shown in FIG. 6 may be repeated.

The image processing section 70 outputs an image output start signal at time t1, and outputs image data from 1st line to the image writing section 30. After receiving the image output start signal, the control section 60 turns ON a LD control signal at time t2 when a predetermined time lapsed (referred to as "leading end timing"), and turns ON any of the LD switches 35-38. Thus, the image data outputted from the image processing section 70 is outputted to any of the laser diodes 31-34 at the leading end timing to irradiate a laser beam. Because the laser beam is irradiated at time t2 when the predetermined time lapsed from time t1, the required leading-end-void is provided on the sheet.

The density detecting section 90 adds up the image densities based on the image data outputted from the image processing section 70 from the leading end timing (i.e., time t2). The image processing section 70 outputs a rear-end advance notice signal to the control section 60 and the density detecting section 90 at time t3. In this embodiment, time t3 is a timing when the image data of Nth line is outputted from the image processing section 70. The density detecting section 90 detects the sum of the dots of each color of the image densities at a reception of the rear-end advance notice signal, and outputs the detected image density.

Upon receiving the rear-end advance notice signal, the control section 60 then refers to the rear-end cut timing table to compare the detected image density and the threshold value Th. When the detected image density is equal to or lower than the threshold value Th, the control section 60 then determines that the image density is the normal density, and adjustment of the rear-end-void length is not necessary. Thus, the control section 60 generates the rear-end cut timing signal at time t3 (that is, at a timing where the image data at Nth line is outputted), and turns OFF the LD control signal.

On the other hand, when the detected image density is higher than the threshold value Th, the control section 60 determines that the image density is "high density," and adjustment of the rear-end-void length is necessary. Thus, the control section 60 generates the rear-end cut timing signal at time t4 that is delayed for a predetermined time after time t3 (that is, at a timing where the image data at (N+$\alpha$)th line is outputted), and turns OFF the LD control signal. This operation makes the length of the image forming area longer (or the rear-end-void length shorter). The image processing section 70 terminates the output of the image data at time t5 when the image data reaches the final line.

Figure 7:
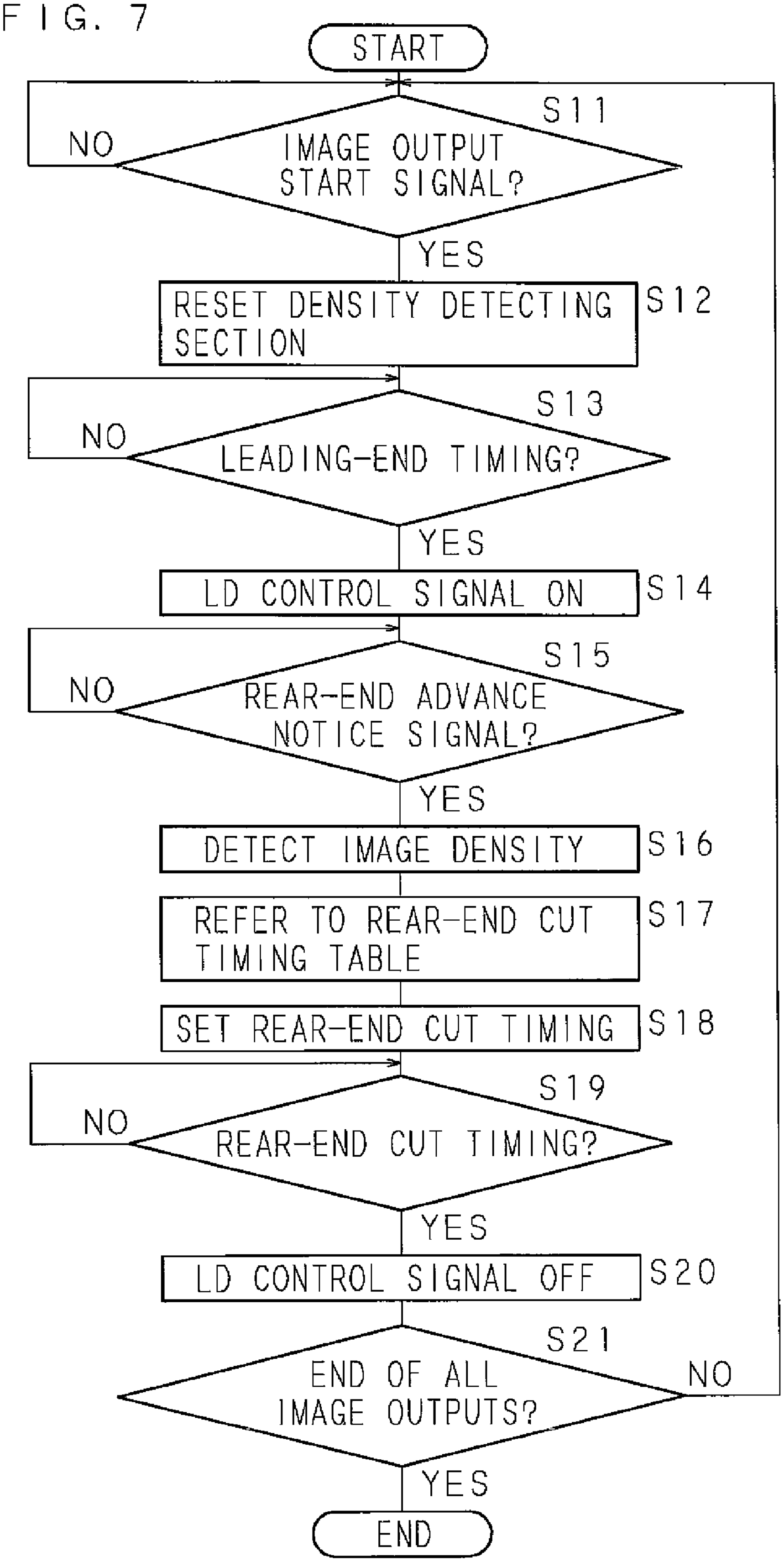
FIG. 7 is a flowchart showing a processing procedure of the image formation in the single color mode of the image forming apparatus.

FIG. 7 is a flowchart showing a processing procedure of the image formation in the single color mode of the image forming apparatus according to the present invention. First, the control section 60 determines a reception of the image output start signal (S11). While the image output start signal is not received (NO in S11), the control section 60 repeats the process of step S11 to stand by until the image output start signal is received.

When the image output start signal is received (YES in S11), the control section 60 once resets the image density computed by the density detecting section 90, and determines whether it reaches the leading end timing (S13). While it does not reach the leading end timing (NO in S13), the control section 60 repeats the process of step S13 to stand by until it reaches the leading end timing. On the other hand, when it reaches the leading end timing (YES in S13), the control section 60 then turns ON the LD control signal (S14) to output the image data outputted from the image processing section 70 to any of the laser diodes 31-34 at the leading end timing and, thereby irradiating a laser beam.

Next, the control section 60 determines a reception of the rear-end advance notice signal (S15). While the rear-end advance notice signal is not received (NO in S15), the control section 60 repeats the process of step S15 to stand by until the rear-end advance notice signal is received. On the other hand, when the rear-end advance notice signal is received (YES in S15), the control section 60 then detects the image density (S16), and then refers to the rear-end cut timing table (S17) to set the rear-end cut timing according to the detected image density (S18). Next, the control section 60 determines whether it reaches the rear-end cut timing (S19). While it does not reach the rear-end cut timing (NO in S19), the control section 60 repeats the process of S19 to stand by until it reaches the rear-end cut timing.

On the other hand, when it reaches the rear-end cut timing (YES in S19), the control section 60 then generates the rear-end cut timing signal to turn OFF the LD control signal (S20). Next, the control section 60 determines whether all the image outputs are finished (S21). When all the image output are not finished (NO in S21), the control section 60 starts over the whole processing procedure from step S11. On the other hand, when all the image output are finished (YES in S21), the control section 60 then terminates this processing procedure.

Figure 8:
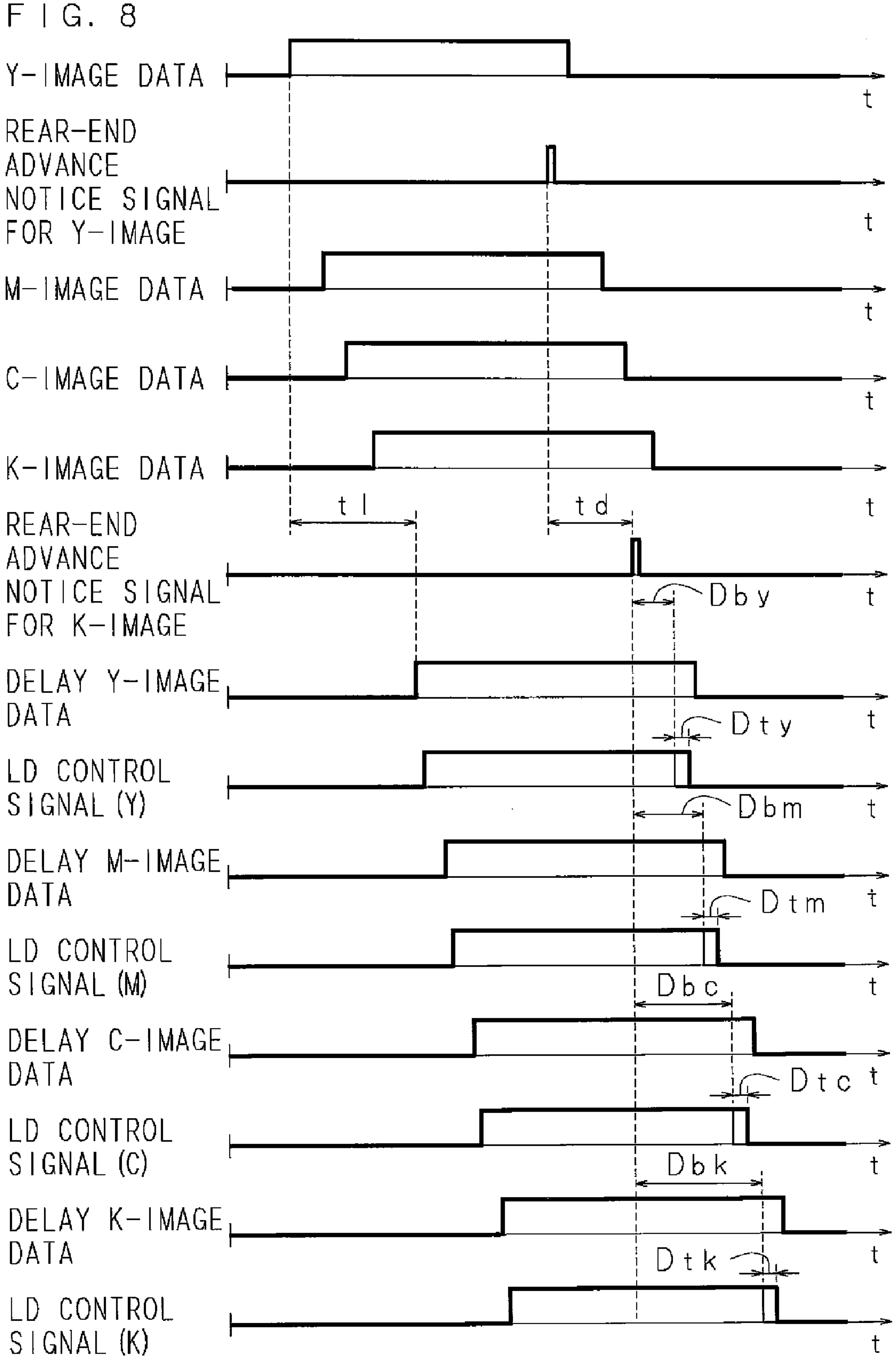
FIG. 8 is a timing chart during the image formation in a multiple color mode of the image forming apparatus.

FIG. 8 is a timing chart of the image formation in the multiple color mode of the image forming apparatus 100 according to the present invention. Further, FIG. 8 shows a case where an image for one sheet page is formed based on respective image data of yellow (Y), magenta (M), cyan (C), and black (K) (hereinafter, referred to as "Y-image data," "M-image data," "C-image data," and "K-image data," respectively). When images are formed on a plural of sheets, the processing procedure of the flowchart shown in FIG. 8 may be repeated.

In order to sequentially and superimposedly transfer the images in yellow, magenta, cyan, and black onto the outer circumferential surface of the intermediate transfer belt 11, the image processing section 70 outputs Y-image data, M-image data, C-image data, and K-image data to the line memories 44, 43, 42, and 41 at arbitrarily different timings that are offset for each other, respectively. The line memories 44, 43, 42, and 41 delay the Y-image data, M-image data, C-image data, and K-image data for a predetermined time, respectively, and then the delayed Y-image data, delayed M-image data, delayed C-image data, and delayed K-image data are outputted to the image writing section 30. For example, the line memory 44 delays the Y-image data outputted from the image processing section 70 for a delay time t1 to output the delayed K-image data to the image writing section 30.

The control section 60 turns ON an LD control signal (Y), LD control signal (M), LD control signal (C), and LD control signal (K) at the leading end timing with respect to the delayed Y-image data, delayed M-image data, delayed C-image data, and delayed K-image data, respectively, to start irradiation of the laser beams. The control section 60 detects the density of the Y-image data at the timing of receiving the rear-end advance notice signal for the Y-image, detects the density of the M-image data at the timing of receiving the rear-end advance notice signal for the M-image, detects the density of the C-image data at the timing of receiving the rear-end advance notice signal for the C-image, and lastly, detects the density of the K-image data at the timing of receiving the rear-end advance notice signal for the K-image, to detect the image density for one sheet page by adding up the image densities of all colors.

Assuming that a time difference between the rear-end advance notice signal of the Y-image and the rear-end advance notice signal of the K-image is "td," the delay time t1 of the line memory 44 for the Y-image data indicates a relationship of "$t1 \geqq td$." Thus, when an image is formed based on yellow image data, it is possible to prevent an occurrence of the case in which output of the image data to the image writing section 30 (i.e., formation of an electrostatic latent image on the photosensitive drum 101*d* for yellow) is finished before the detection of the image densities of all the four colors is finished. The same can be applied to image data of magenta and cyan.

If the detected image densities are equal to or less than the predetermined threshold value, the control section 60 determines that the image densities are normal and, thus, it does not perform the adjustment of the rear-end-void length. Then, the control section 60 determines the rear-end cut timings based on predetermined reference delay amounts Dby, Dbm, Dbc, and Dbk (all are offsets from the rear-end advance notice signal of K-image) for the delayed Y-image data, delayed M-image data, delayed C-image data, and delayed K-image data, respectively. The reference delay amounts Dby, Dbm, Dbc, and Dbk may be limited to zero.

On the other hand, if the detected image densities are higher than the predetermined threshold value, the control section 60 determines that the image densities are high and, thus, it determines the rear-end cut timings based on the delay amounts Dty, Dtm, Dtc, and Dtk (all are offsets from the reference delay amounts Dby, Dbm, Dbc, and Dbk) for the delayed Y-image data, delayed M-image data, delayed C-image data, and delayed K-image data, to adjust the rear-end-void length.

Figure 9:
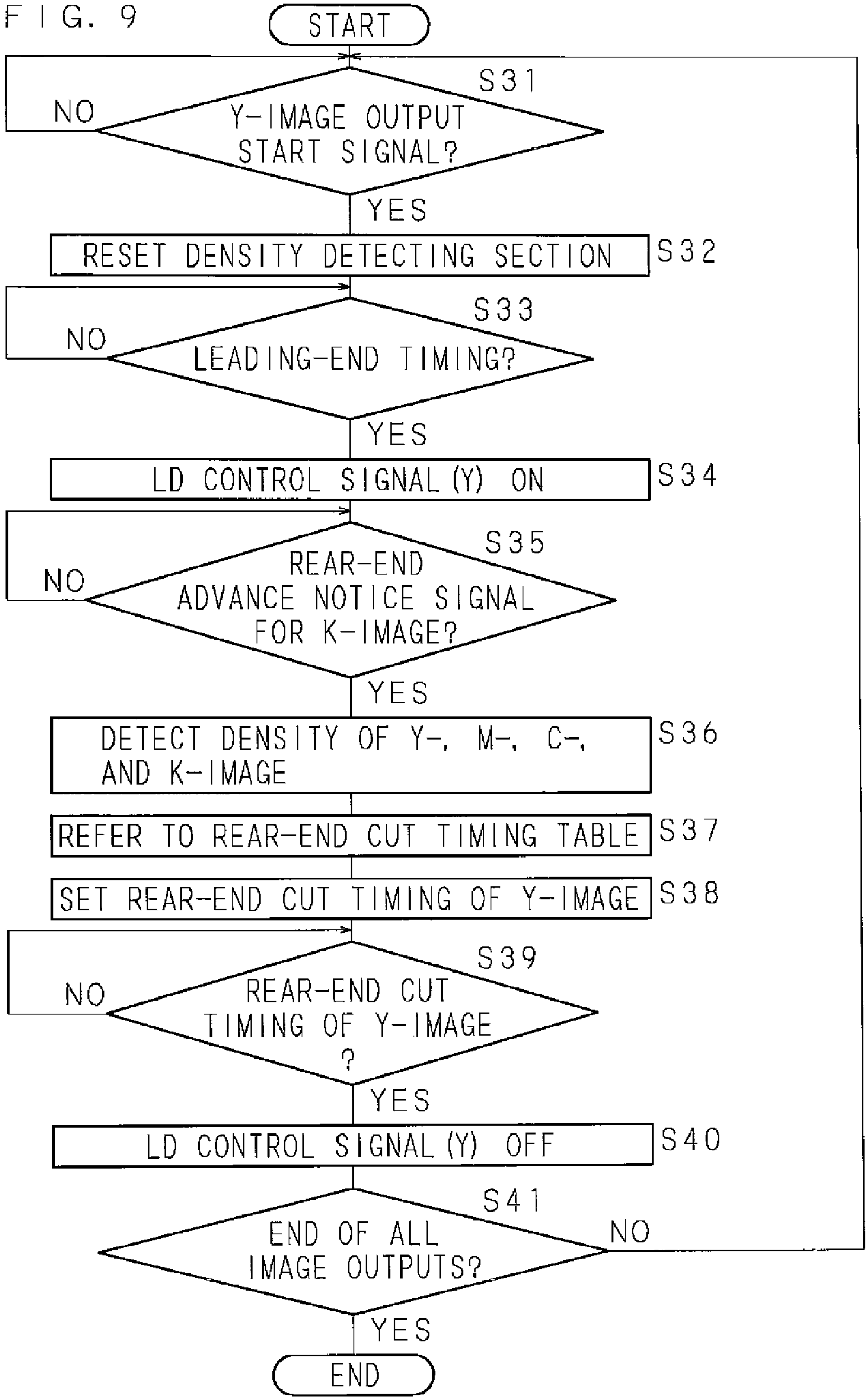
FIG. 9 is a flowchart showing a processing procedure of the image formation in the multiple color mode of the image forming apparatus.

FIG. 9 is a flowchart showing a processing procedure of the image formation in the multiple color mode of the image forming apparatus according to the present invention. In the example of FIG. 9, a processing procedure for yellow (Y) image (i.e., Y-image) will be explained. However, the similar processing procedure may be applied to that of other colors, such as magenta, cyan, and black.

First, the control section 60 determines a reception of Y-image output start signal (S31). While the Y-image output start signal is not received (NO in S31), the control section 60 repeats the process of step S31 to stand by until the Y-image output start signal is received. On the other hand, when the Y-image output start signal is received (YES in S31), the control section 60 once resets the image density computed by the density detecting section 90, and then determines whether it reaches the leading end timing (S33). While it does not reach the leading end timing (NO in S33), the control section 60 repeats the process of step S33 to stand by until it reaches the leading end timing. On the other hand, when it reaches the leading end timing (YES in S33), the control section 60 then turns ON the LD control signal for yellow (Y) (S34) to output the yellow image data outputted from the image processing section 70 to the laser diode 34 at the leading end timing and, thereby, irradiating a laser beam.

Next, the control section 60 determines a reception of the rear-end advance notice signal for K-image (S35). While the rear-end advance notice signal for K-image is not received (NO in S35), the control section 60 repeats the process of step S35 to stand by until the rear-end advance notice signal for K-image is received. On the other hand, when the rear-end advance notice signal for K-image is received (YES in S35), the control section 60 then detects the image densities of Y-, M-, C-, and K-images (S36), and then refers to the rear-end cut timing table (S37) to set a rear-end cut timing of Y-image corresponding to all the detected image densities (S38). The rear-end cut timings of M-image, C-image, and K-image may be set similar to that of Y-image, however, the timings may be different from each other. Next, the control section 60 determines whether it reaches the rear-end cut timing of Y-image (S39). While it does not reach the rear-end cut timing of Y-image (NO in S39), the control section 60 repeats the process of S39 to stand by until it reaches the rear-end cut timing of Y-image.

On the other hand, when it reaches the rear-end cut timing of Y-image (YES in S39), the control section 60 then generates a rear-end cut timing signal for Y-image to turn OFF the LD control signal (Y) (S40). Next, the control section 60 determines whether all the image outputs are finished (S41). When all the image outputs are not finished (NO in S41), then, the control section 60 starts over the entire processing procedure from step S31. On the other hand, when all the image outputs are finished (YES in S41), the control section 60 then terminates this processing procedure.

(Embodiment 2)

In the configuration of Embodiment 1 described above, the number of dots contained in image data is computed at the rear-end cut timing (Nth line of the image data) that is a reference when the image density is "normal" (that is, the image density is equal to or lower the threshold value) to detect the image density. Further, when the image density is higher than the threshold value, the rear-end-void length is adjusted by increasing image data outputted up to (N+$\alpha$)th line. However, the adjustment of the rear-end-void may not be limited to the above configuration, and may be performed by magnifying the image, as described below.

Figure 10:
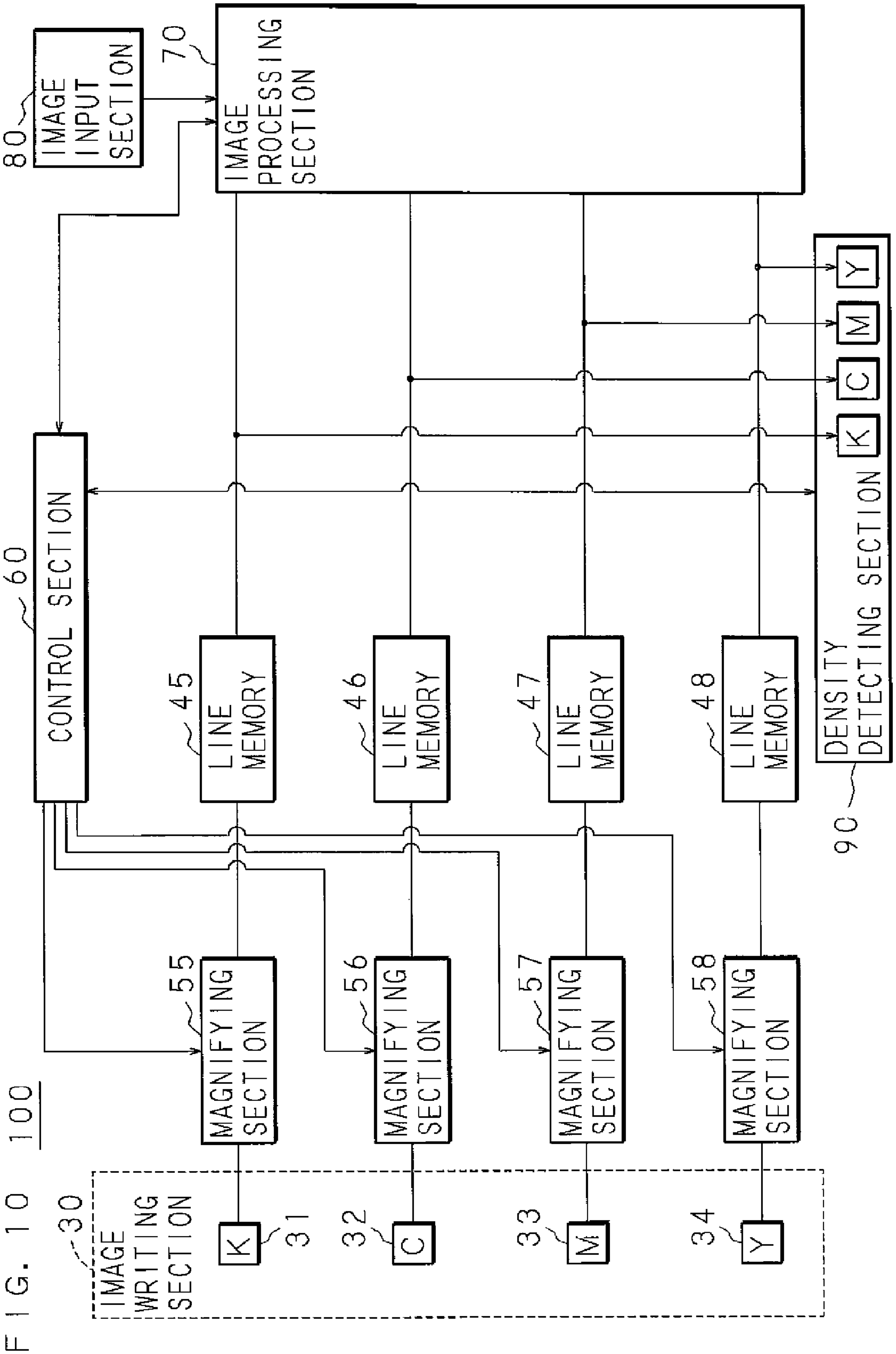
FIG. 10 is a block diagram showing a configuration of an image forming apparatus of Embodiment 2.

FIG. 10 is a block diagram showing a configuration of the image forming apparatus 100 according to Embodiment 2. The image forming apparatus 100 includes an image input section 80, an image processing section 70, a control section 60, a density detecting section 90, an image writing section 30, line memories (LM) 45-48, and magnifying sections 55-58. The configuration of this embodiment is different from that of Embodiment 1 in that the magnifying sections 55-58 are provided instead of the LD switches 35-38 and the LM switches 51*a*-54*b*, and the line memories 45-48 are provided instead of the line memories 41-44. The line memories 45-48 of this embodiment does not delay an output timing of image data to the image writing section 30, but temporarily stores image data for one sheet page.

Further, the density detecting section 90 of this embodiment does not detect an image density by adding up the number of dots contained in image data at the time of the reception of the rear-end advance notice signal, as described in Embodiment 1. Instead, the density detecting section 90 of this embodiment detects an image density by adding up the number of dots in a pixel contained in the entire image data for one sheet page outputted from the image processing section 70 to the line memories 45-48. The density detecting section 90 outputs the detected image density to the control section 60.

The control section 60 refers to a magnifying ratio table indicating a relationship between a predetermined image density and a magnifying ratio, then determines the magnifying ratio corresponding to the image density inputted from the density detecting section 90, and then outputs the determined magnifying ratio to the magnifying sections 55-58. The magnifying sections 55-58 magnify the image data (image) taken out from the line memories 45-48 according to the magnifying ratio inputted from the control section 60 (one-side magnification in the sheet conveying direction in this embodiment), and then output the magnified image data to the image writing section 30. When the multiple color mode is selected, the control section 60 offsets output timings of the image data for yellow, magenta, cyan, and black to the image writing section 30, as similar to Embodiment 1.

Figure 11A:
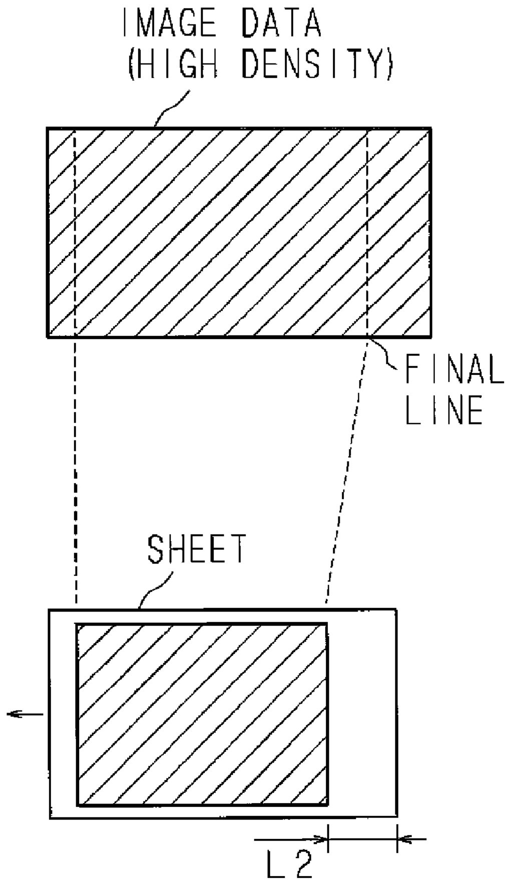
FIGS. 11A and 11B are explanatory diagrams showing examples of suppressing a variation in a rear-end-void length due to a magnifying process.
Figure 11B:
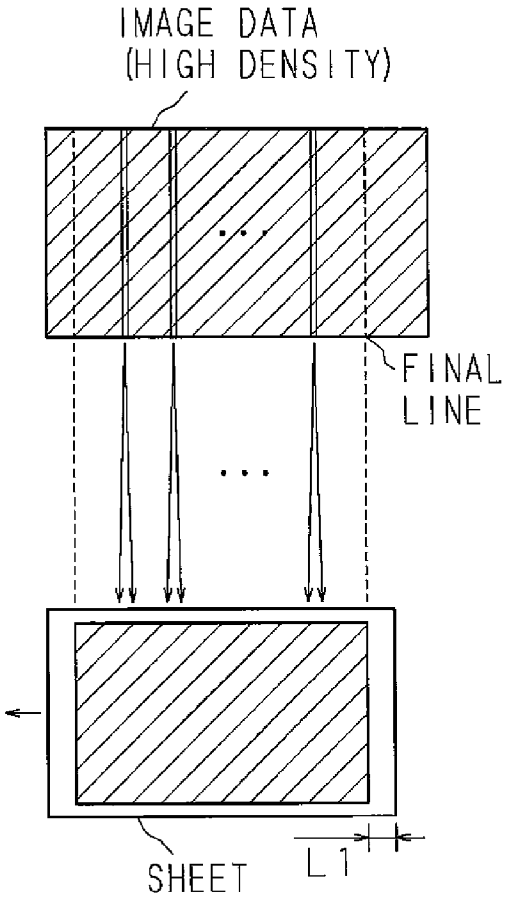

FIGS. 11A and 11B are explanatory diagrams showing examples of suppressing the variations in the rear-end-void length by the magnifying process. In FIGS. 11A and 11B, each of the upper drawings indicates the image data for one sheet page, and the lower drawings indicate sheets formed with the images. The arrows indicate the sheet conveying direction. In this embodiment, the image formation may be performed in either by the single color mode or the multiple color mode. Further, the image formation starts at the leading end timing of the image data, and the image formation for one sheet page is completed at the final line of the image data.

FIG. 11A shows a case where the image density is higher than a predetermined threshold value (referred to as "high density"). When the image density becomes higher, the printing length becomes shorter due to a sheet slip during fusing, and consequently, the rear-end-void length L2 becomes longer than the rear-end-void length L1 of the normal image density (i.e., L2>L1).

FIG. 11B shows a case where the rear-end-void length is adjusted. As shown in FIG. 11B, every time the image data of adjacent plural lines between the leading end timing and the final line of the image data are outputted to the image writing section 30 in accordance with the magnifying ratio, the image data in the same line is outputted twice in succession. Thus, the number of lines for the image data outputted to the image writing section 30 is increased. As a result, the image forming area becomes larger (or longer) due to the image data with increased lines to make the rear-end-void length to "L1." In this embodiment, the relationship between the image density and the magnifying ratio may be stored inside the control section 60 as a form of magnifying ratio table.

Accordingly, because the image is substantially uniformly magnified, the image can be prevented from being reduced in size due to the sheet slip. Further, the rear-end-void can be adjusted without deteriorating the image quality, while suppressing an abnormal magnification of the formed image. The magnifying method described herein is merely an example, and not particularly limited to this method. For example, the image data in the same line may be outputted three times or more in succession instead of two times in succession.

(Embodiment 3)

Figure 12:
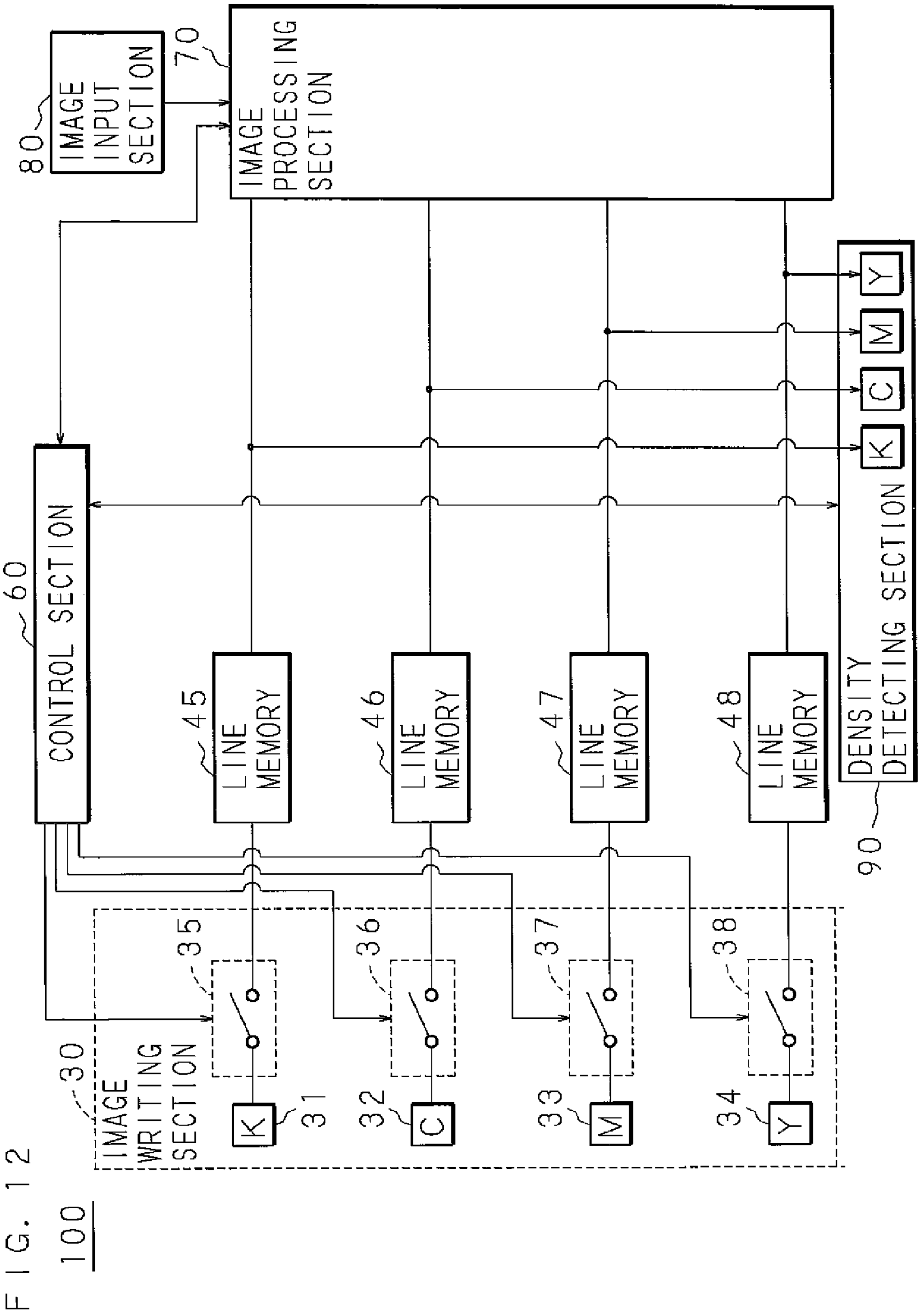
FIG. 12 is a block diagram showing a configuration of an image forming apparatus of Embodiment 3.

FIG. 12 is a block diagram showing a configuration of the image forming apparatus 100 according to Embodiment 3. The image forming apparatus 100 includes an image input section 80, an image processing section 70, a control section 60, a density detecting section 90, an image writing section 30, and line memories (LM) 45-48. The configuration of this embodiment is different from that of Embodiment 1 in that LM switches 51*a*-54*b* are not provided, and the line memories 45-48 are provided instead of the line memories 41-44. The line memories 45-48 of this embodiment does not delay an output timing of the image data to the image writing section 30, but temporarily stores the image data for one sheet page.

Further, the density detecting section 90 of this embodiment does not detect an image density by adding up the number of dots contained in image data at the reception of the rear-end advance notice signal, as described in Embodiment 1. Instead, the density detecting section 90 of this embodiment detects an image density by adding up the number of dots in a pixel contained in the entire image data for one sheet page outputted from the image processing section 70 to the line memories 45-48. The density detecting section 90 outputs the detected image density to the control section 60.

The control section 60 stores a line number table indicating a relationship between a predetermined image density and the number of lines of the image data for one sheet page, then determines a line number corresponding to the image density inputted from the density detecting section 90, and then outputs an LD control signal based on the determined line number. The LD switches 35-38 are subjected to ON/OFF control based on the LD control signal, and the image data of the line number corresponding to the image density is outputted from the line memories 45-48 to the laser diodes 31-34. As a result, the image forming area becomes larger (or longer) due to the image data of the increased lines according to the image density to allow the rear-end-void length to be adjusted.

As described above, according to the embodiments of the present invention, the variation in the rear-end-void may be suppressed to prevent the deterioration of the image quality. Further, the detection of the image density may be performed, while performing the irradiation of laser beam at the same time to improve the processing speed of the image formation. The occurrence of the case in which the output of the image data to the image writing section is finished before the detection of the image density is finished may be prevented. Further, even if the schemes of the present invention is applied to different models of different functions (e.g., printing speed), the rear-end-void may be readily adjusted only by storing the information specific to those models. Further, the rear-end-void may be adjusted, while suppressing the abnormal magnification of the image. Further, at the time of double-side printing, the sheet may be prevented from adhering to the fusing roller, while being winded up around the fusing roller.

Further, in the embodiments above, the intermediate-transfer type color image forming apparatus has been described. However, an application of the present invention is not limited to this type, and may also be applicable to a monochrome image forming apparatus.

At this invention may be embodied in several forms without departing from the spirit of essential characteristics thereof the present embodiment is therefore illustrative and not restrictive, since the scope of the present invention is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus, comprising:

a light irradiating section that irradiates light to form an electrostatic latent image on a surface of a photosensitive drum;

an image data outputting section that outputs image data to the light irradiating section;

a developing section that develops the electrostatic latent image on the surface of the photosensitive drum;

a transferring section that transfers the developed electrostatic latent image to form an image on a sheet in an image forming area of said sheet;

a density detecting section that detects an image density by adding up a number of dots in each pixel in a predetermined range of the image data outputted by the image data outputting section; and an adjusting section that adjusts a size of the image forming area of said sheet using only the summed-dot count from the density detecting section.

2. The image forming apparatus of claim 1, wherein the image data outputting section outputs the image data in a plurality of colors; and wherein the density detecting section detects the image density by adding up the number of dots in each pixel of the image data in the plurality of colors when forming the image on the sheet based on the image data in the plurality of colors.

3. The image forming apparatus of claim 1, further comprising a control section that controls an irradiation start timing and/or an irradiation end timing of the light being irradiated by the light irradiating section using only the summed-dot count from the density detecting section;

wherein the adjusting section adjusts the size of the image forming area on the sheet based on the control result by the control section.

4. The image forming apparatus of claim 3, wherein the density detecting section detects the image density based on the image data outputted up to a predetermined detection timing by the image data outputting section; and wherein the control section controls the irradiation end timing of the light being irradiated by the light irradiating section according to the detected image density.

5. The image forming apparatus of claim 4, wherein the density detecting section detects the image density based on the image data in the plurality of colors outputted by the image data outputting section up to the predetermined detection timing when forming the image on the sheet based on the image data in the plurality of colors.

6. The image forming apparatus of claim 5, further comprising a delaying section that delays an output timing to the light irradiating section for each of the image data in the plurality of colors outputted by the image data outputting section when forming the image on the sheet based on the image data in the plurality of colors.

7. The image forming apparatus of claim 6, wherein a delay time of the image data in each color delayed by the delaying section is more than a time difference between a first detection timing at which the image density is detected based on the image data in each color and a second detection timing at which the image density is detected based on the image data in the color of the image to be formed finally on the sheet.

8. The image forming apparatus of claim 6, further comprising an inhibiting section that inhibits the delay of the output timing to the light irradiating section for the image data in a single color when forming the image on the sheet based on the image data in the single color.

9. The image forming apparatus of claim 3, further comprising a storage section that stores information associated with the image density and the irradiation end timing of the light.

10. The image forming apparatus of claim 1, further comprising a magnifying section that varies a magnifying ratio of the image using the summed-dot count from the density detecting section;

wherein the adjusting section adjusts the size of the image forming area on the sheet according to the magnifying ratio varied by the magnifying section.

11. The image forming apparatus of claim 10, wherein the magnifying section performs a one-sided magnification of the image along a conveying direction of the sheet.

12. The image forming apparatus of claim 1, wherein the density detecting section detects the image density based on the image data for each sheet page.

13. The image forming apparatus of claim 1, wherein the adjusting section adjusts the size of the image forming area by providing a margin area on a rear-end side of the sheet in a conveying direction thereof.

14. An image forming method in which light is irradiated to form an electrostatic latent image on a surface of a photosensitive drum based on image data, the electrostatic latent image is developed, and the developed electrostatic latent image is transferred to form an image on a sheet in an image forming area of the sheet, the method comprising:

detecting an image density by adding up a number of dots in each pixel in a predetermined range of the image data; and adjusting a size of the image forming area of said sheet using only the summed-dot count from said detecting an image density.

15. The image forming method of claim 14, wherein an irradiation start timing and/or an irradiation end timing of the light being irradiated is controlled using only the summed-dot count from said detecting an image density, and the size of the image forming area on the sheet is adjusted by controlling the irradiation start timing and/or the irradiation end timing.

16. The image forming method of claim 15, wherein the image density is detected based on the image data inputted up to a predetermined detection timing, and the irradiation end timing of the light being irradiated is controlled according to the detected image density.

17. The image forming method of claim 16, wherein the image density is detected based on the image data in a plurality of colors inputted up to the predetermined detection timing when forming the image on the sheet based on the image data in the plurality of colors.

18. The image forming method of claim 17, wherein an input timing is delayed for each of the inputted image data in the plurality of colors when forming the image on the sheet based on the image data in the plurality of colors.

19. The image forming method of claim 14, wherein the size of the image forming area on the sheet is adjusted by varying a magnifying ratio of the image using only the summed-dot count from said detecting an image density.

20. The image forming method of claim 14, wherein the size of the image forming area is adjusted by providing a margin area on the rear-end side of the sheet in a conveying direction thereof.

* * * * *